United States Patent
Kako et al.

[11] Patent Number: 5,937,808
[45] Date of Patent: Aug. 17, 1999

[54] VALVE TIMING CONTROL SYSTEM FOR INTERNAL COMBUSTION ENGINE

[75] Inventors: Hajime Kako; Koji Nishimoto, both of Tokyo, Japan

[73] Assignee: Mitsubishi Denki Kabushiki Kaisha, Tokyo, Japan

[21] Appl. No.: 09/050,975

[22] Filed: Mar. 31, 1998

[30] Foreign Application Priority Data

Dec. 15, 1997 [JP] Japan ................................. 9-345264

[51] Int. Cl.⁶ .................................................. F01L 1/34
[52] U.S. Cl. ................................. 123/90.15; 123/90.17
[58] Field of Search ............................ 123/90.15, 90.16, 123/90.17, 90.31

[56] References Cited

U.S. PATENT DOCUMENTS

| | | | |
|---|---|---|---|
| 5,363,817 | 11/1994 | Ikeda et al. | 123/90.15 |
| 5,417,187 | 5/1995 | Meyer et al. | 123/90.15 |
| 5,522,352 | 6/1996 | Adachi et al. | 123/90.15 |
| 5,562,071 | 10/1996 | Urushihata et al. | 123/90.15 |
| 5,611,304 | 3/1997 | Shinojima | 123/90.15 |
| 5,680,834 | 10/1997 | Szpak et al. | 123/90.15 |

FOREIGN PATENT DOCUMENTS 06159021  6/1994  Japan .
08074530  3/1996  Japan .
09060508  3/1997  Japan .

*Primary Examiner*—Weilun Lo
*Attorney, Agent, or Firm*—Sughrue, Mion, Zinn, Macpeak & Seas, PLLC

[57] ABSTRACT

A valve timing control system for an internal combustion engine which is capable of making an actual valve timing converge rapidly to a desired valve timing immediately after power-on includes a desired valve timing arithmetic means (202) for arithmetically determining desired valve timings (To) for an intake valve (17) and an exhaust valve (18), respectively, in dependence on an engine operation state (D) as detected, a variable valve timing mechanism (40) for changing open/close timings of the intake valve (17) and the exhaust valve (18), an actual valve timing detecting means (203) for detecting actual valve timings (Ta) of the intake valve (17) and the exhaust valve (18), respectively, an actual valve timing control means (204) for generating a control quantity (i) for the variable valve timing mechanism (40) so that a timing deviation (ER) of the actual valve timing (Ta) from the desired valve timing (To) becomes zero, an integral control means (205) for arithmetically determining an integral correcting value ($\Sigma Ki$) for correcting the control quantity (i) by integrating the timing deviation (ER), and a learning means (206) for acquiring a learned value (LRN) of a control quantity (ih) required for holding the actual valve timing (Ta) on the basis of the integral correcting value ($\Sigma Ki$)

15 Claims, 21 Drawing Sheets

ROTATING DIRECTION

ROTATING DIRECTION OF VARIABLE VALVE TIMING MECHANISM 40

VALVE TIMING CONTROL SYSTEM FOR INTERNAL COMBUSTION ENGINE

BACKGROUND OF THE INVENTION

1. Field of the Invention

The present invention relates generally to a valve timing control system for adjusting or controlling valve timing at which an intake valve and/or an exhaust valve is opened or closed in dependence on operating state or condition of an internal combustion engine. More specifically, the present invention is concerned with a valve timing control system for making the actual valve timing as detected really converge rapidly or speedily to a desired valve timing even at a time point which follows immediately power-on of the internal combustion engine system to thereby prevent operation performance and exhaust gas discharge performance of the engine from being degraded or deteriorated.

2. Description of Related Art

In the technical field of the internal combustion engine, a system for controlling variably the operation timing for at least one of an intake valve and an exhaust valve in dependence on the operation state of the internal combustion engine is well known in the art, as is disclosed, for instance, in Japanese Unexamined Patent Application Publication No. 60508/1997 (JP-A-9-60508). Further, a control system to this end has also been proposed, as is disclosed, for instance, in Japanese Patent Laid-open No. 159021/1994 (JP-A-6-159021). For having better understanding of the concept underlying the present invention, description will first be made in some detail of a conventional valve timing control system for an internal combustion engine by reference to FIGS. 10 to 29.

FIG. 10 is a schematic diagram showing generally a configuration of a gasoline engine system equipped with a conventional valve-timing regulating or controlling mechanism. Referring to the figure, an internal combustion engine denoted generally by reference numeral 1 constitutes a major part of the gasoline engine system and includes a plurality of cylinders (e.g. four cylinders). In FIG. 10, however, only one cylinder and associated components are illustrated representatively.

As is shown in FIG. 10, a cylinder block 2 forms a cylinder portion of the engine 1. A cylinder head 3 is connected to the cylinder block 2 at a top end thereof. A piston 4 is housed within a cylinder chamber formed in the cylinder block 2 so as to move reciprocatively in the vertical direction. A crank shaft 5 is operatively coupled to the piston 4 at a bottom end thereof and caused to rotate in unison with the reciprocative motion of the piston 4.

A crank angle sensor 6 which can be disposed, for example, in the vicinity of the crank shaft 5 is constituted by an electromagnetic pickup or sensor to serve for generating a crank angle signal SGT in synchronism with revolution of the engine 1. The crank angle signal SGT is utilized not only for detecting the engine speed or engine rotation number NE (rpm) of the engine 1 but also for the detection that the crank shaft 5 is at a predetermined reference crank angle (°CA).

A signal rotor 7 is integrally mounted on the crank shaft 5 and has an outer peripheral surface formed with a pair of teeth 7a with an angular distance of 180° therebetween. The teeth 7a are formed of a magnetic material. Upon every passing of each tooth 7a in front of the crank angle sensor 6, a pulse-like crank angle signal SGT is generated by the crank angle sensor 6.

A combustion chamber 8 is defined by inner walls of the cylinder block 2 and the cylinder head 3 and a top wall of the piston 4, respectively. Air-fuel mixture charged into the engine 1 undergoes combustion within the combustion chamber 8. A spark plug 9 is disposed at the top of the cylinder head 3 so as to partially project into the combustion chamber 8. The air-fuel mixture is fired by electric discharge taking place in the spark plug 9.

A distributor 10 is installed, being coupled to an exhaust-side cam shaft 20 (described hereinafter) which is mounted on the cylinder head 3 for applying a high ignition voltage sequentially to the spark plugs 9 provided for the individual cylinders, respectively. To this end, an ignitor 11 is provided for generating the high firing voltage.

More specifically, each of the spark plugs 9 is electrically connected to the distributor 10 by way of a high-voltage rated cord (not shown), wherein the high voltage outputted from the ignitor 11 is distributed to the individual spark plugs 9, respectively, in synchronism with the rotation of the crank shaft 5 by means of the distributor 10.

Further installed in association with the cylinder block 2 is a water temperature sensor 12 which serves for detection of a temperature W of cooling water flowing through a coolant passage.

An intake port 13 is provided at an intake side of the cylinder head 3 while an drain port 14 is disposed at an exhaust side of the cylinder head 3. An intake passage 15 is communicated to the intake port 13 with an exhaust passage 16 being communicated to the drain port 14. An intake valve 17 is disposed in the intake port 13 of the cylinder head 3 while an exhaust valve 18 is installed in the drain port 14 of the cylinder head 3.

An intake-side cam shaft 19 is disposed above the intake valve 17 for driving the intake valve 17 toward the open or close state. Similarly, the exhaust-side cam shaft 20 is disposed above the exhaust valve 18 for opening or closing the exhaust valve 18.

An intake timing pulley 21 is mounted on the intake-side cam shaft 19 at one end thereof, while an exhaust timing pulley 22 is mounted on the exhaust-side cam shaft 20 at one end thereof. The intake timing pulley 21 and the exhaust timing pulley 22 are operatively coupled to the crank shaft 5 by means of a timing belt 23 so that each of the cam shafts 19 and 20 can rotate at a speed substantially equal to a half of the rotation speed of the crank shaft 5.

When the engine 1 is in the operating state, the driving torque of the crank shaft 5 is transmitted to the cam shafts 19 and 20, respectively, by way of the timing belt 23 and the timing pulleys 21 and 22 to rotate the cam shafts 19 and 20, respectively.

Thus, the intake valve 17 and the exhaust valve 18 are driven, respectively, to the open/close states in synchronism with the rotation of the crank shaft 5 and hence the reciprocative motion of the piston 4. In other words, each of the intake valve 17 and the exhaust valve 18 is driven with a predetermined open/close timing in synchronism with a series of four strokes, i.e., suction stroke, compression stroke, explosion (expansion) stroke and exhaust stroke of the engine 1.

A cam angle sensor 24 is disposed in the vicinity of the intake-side cam shaft 19 and designed to generate a cam angle signal SGC for detecting the actuation timing (i.e., valve timing) of the intake valve 17.

A signal rotor 25 is integrally mounted on the intake-side cam shaft 19, wherein the outer peripheral surface of the signal rotor 25 is formed with four teeth 25a at an angular distance of 90° therebetween. Each of the teeth 25a is formed of a magnetic material, Every time each of the teeth 25a passes in front of the cam angle sensor 24, a pulse-like cam angle signal (pulse signal indicating the angular position of the cam) SGC is generated by the cam angle sensor 24.

A throttle valve 26 is installed in the intake passage 15 at an intermediate portion thereof and adapted to be selectively opened or closed in response to actuation of an accelerator pedal (not shown), whereby the air-flow quantity fed to the engine 1, i.e., the intake air flow Q, is adjusted or regulated. To this end, a throttle sensor 27 is operatively coupled to the throttle valve 26 for detecting the throttle opening degree θ.

An intake air-flow sensor 28 is disposed at a location upstream of the throttle valve 26 for detecting the intake air flow Q in the intake passage 15 by resorting to, for example, thermal detection technique which per se is known in the art. Further, a surge tank 29 is installed at a location downstream of the throttle valve 26 for suppressing the pulsation of the intake air flow Q.

A fuel injector 30 is mounted in the vicinity of the intake port 13 of each of the individual cylinders, respectively, for injecting fuel for charging the air-fuel mixture into the combustion chamber 8. Each of the fuel injectors 30 is ordinarily constituted by an electromagnetic valve which is opened upon electric energization. Fuel is fed to each of the fuel injectors 30 under pressure from a fuel pump (not shown).

In operation of the engine 1, air is taken into the intake passage 15 while the fuel injector 30 injects fuel in the direction toward the intake port 13. As a result of this, air-fuel mixture is produced in the intake port 13 to be sucked into the combustion chamber 8 through the intake valve 17 which is adapted to open in the suction stroke.

A variable valve timing mechanism 40 is operatively coupled to the intake-side cam shaft 19 and designed to be driven hydraulically (through the medium of lubricant oil of the engine 1) for changing or modifying the valve operation timing of the intake valve 17 (or at least one of the intake valve 17 and the exhaust valve 18). More specifically, the variable valve timing mechanism 40 is so designed as to change the valve operation timing of the intake valve 17 continuously by changing or varying the angle of displacement of the intake-side cam shaft 19 relative to the intake timing pulley 21. To this end, an oil control valve 80 is provided for supplying working oil to the variable valve timing mechanism 40 as well as for adjusting the amount of the working oil.

For the purpose of overall control of the engine operation, there is provided an electronic control unit 100 for controlling operations of the various actuators such as the fuel injector 30, the ignitor 11, the oil control valve 80 and others for controlling the fuel injection quantity, the ignition timing, the valve operation timing and others on the basis of the output signals of the various sensors such as the intake air flow Q, cooling water temperature W, crank angle signal SGT, cam angle signal SGC and others which indicate the operation state of the engine. The electronic control unit 100 may be constituted by a microcomputer or microprocessor, as will be described later on.

Next, description is directed to a structure of a variable valve timing system including the variable valve timing mechanism 40 and the oil control valve 80 by reference to FIGS. 11 to 19. FIG. 11 is a side elevational view showing partially in section a structural arrangement around the intake-side cam shaft 19 provided in association with the variable valve timing mechanism 40. Further, this figure also shows a structure of the working oil supply means (corresponding to the oil control valve 80) for driving the variable valve timing mechanism 40. Parenthetically, in FIG. 11, the components same as or equivalent to those described previously are denoted by like reference characters.

Referring to FIG. 11, the variable valve timing mechanism 40 serves to control the amount of working oil supplied to the variable valve timing mechanism 40. The intake timing pulley 21 rotates in synchronism with the crank shaft 5 through the medium of the timing belt 23 moving in unison with the rotation of the crank shaft 5.

Transmitted translationally to the intake-side cam shaft 19 is the rotation of the intake timing pulley 21 with changed or modified phase due to intervention of the variable valve timing mechanism 40.

A bearing 41 is fixedly mounted on the cylinder head 3 (see FIG. 10) for supporting rotatably the intake-side cam shaft 19.

A first oil passage 42 and a second oil passage 43 are provided in association with the intake-side cam shaft 19 and a rotor 52 (described hereinafter), respectively. The first oil passage 42 is communicated to a retarding hydraulic chamber 62 (described hereinafter) for displacing angularly the rotor 52 in the retarding direction while the second oil passage 43 is communicated to an advancing hydraulic chamber 63 (described hereinafter) for displacing angularly the rotor 52 in the advancing direction.

There is further provided an oil pump 91 for taking out working oil (lubricating oil) from an oil pan 90. Additionally, an oil filter 92 is provided for purifying the working oil taken out from the oil pan 90. The oil pan 90, the oil pump 91 and the oil filter 92 cooperate to constitute the lubricating means for lubricating various parts or components of the engine 1 (see FIG. 10) and at the same time constitute a working oil supply means for the variable valve timing mechanism 40 in cooperation with the oil control valve 80.

A variety of sensors designated generally and collectively by reference numeral 99 includes the sensors such as the crank angle sensor 6 mentioned previously and others provided in association with the engine 1, wherein output signals of these sensors indicating various operation state information of the engine 1 are inputted to the electronic control unit 100.

A spool valve element 82 is mounted within the housing 81 of the oil control valve 80 to move slideably therein. A linear solenoid 83 controls the spool valve element 82 in accordance with a corresponding control signal outputted from the electronic control unit 100. A spring 84 is provided for urging resiliently the spool valve element 82 in the direction opposite to the driving direction of the linear solenoid 83.

The housing 81 is provided with various ports 85 to 87, 88a and 88b.

The oil supplying port 85 is hydraulically communicated to the oil pump 91 by way of the oil filter 92 while an A-port 86 is hydraulically communicated to the second oil passage 43. On the other hand, drain ports 88a and 88b are hydraulically communicated to the oil pan 90.

When the engine 1 is operating, the working oil is discharged from the oil pan 90 by the oil pump 91 which is put into operation in response to the rotation of the crank shaft 5. The working oil as discharged is fed under pressure selectively to the first oil passage 42 or the second oil passage 43 by way of the oil filter 92 and the oil control valve 80.

The flow rate of oil in the first oil passage 42 and the second oil passage 43 (i.e., amount of hydraulic medium or oil flowing through the first oil passage 42 and the second oil passage 43, respectively) is increased or decreased as the opening degrees of the ports 86 and 87 are varied due to sliding movement of the spool valve element 82. In this conjunction, it is noted that the opening degrees of the A-port 86 and the B-port 87 are determined, respectively, in dependence on the value of the control current i (a control quantity) supplied to the linear solenoid 83. Hereinafter, this current will also be referred to as the linear solenoid current i.

To this end, the electronic control unit 100 controls the control current i on the basis of the signals outputted from the various sensors such as the crank angle sensor 6, the cam angle sensor 24 and others.

A housing 44 of the variable valve timing mechanism 40 is mounted rotatably relative to the intake-side cam shaft 19, wherein a casing 45 is fixedly secured to the housing 44. A back spring 46 which may be constituted by a leaf spring is disposed between a tip seal 49 (described hereinafter) and the casing 45 to resiliently urge the tip seal 49 against the rotor 52 (also described hereinafter).

A cover 47 is secured to the casing 45 by means of bolts 48 which secure the housing 44, the casing 45 and the cover 47 to one another. The tip seal 49 is pressed against the rotor 52 by means of the back spring 46 to thereby prevent flow of working oil between the hydraulic chambers partitioned from each other by the rotor 52 and the casing 45 (i.e., prevent leakage of working oil). A plate 50 is secured to the cover 47 by means of a screw 51.

The rotor 52 is fixedly mounted on the intake-side cam shaft 19 and disposed rotatably relatively to he casing 45. The rotor 52 is provided with a cylindrical holder 53 which has a recess adapted to engage with a plunger 54 (described hereinafter).

The plunger 54 provided with a protrusion is adapted to move slideably within the housing 44 under the influence of resiliency of a spring 55 (described hereinafter) and a hydraulic pressure of oil introduced into the holder 53. The spring 55 exerts resilient or spring force for urging the plunger 54 toward the rotor 52. A plunger oil passage 56 feeds working oil for applying the hydraulic pressure to the plunger 54 against the spring force exerted by the spring 55. An air passage 57 is provided for setting constantly to the atmospheric pressure the space formed at the side of the plunger 54 at which the spring 55 is disposed.

The intake-side cam shaft 19 and the rotor 52 are connected fixedly to each other by means of a connecting bolt 58. On the other hand, the intake-side cam shaft 19 and the rotor 52 are interconnected by a rotatable shaft portion of a shaft member 59 which is mounted rotatably relative to the cover 47. An air passage 60 is formed so as to extend through the shaft member 59 and the intake-side cam shaft 19 for setting the inner space defined by the plate 50 to the atmospheric pressure.

FIG. 12 is a fragmentary sectional view showing a state in which a hydraulic pressure is applied to the plunger 54 by way of the plunger oil passage 56.

As can be seen in FIG. 12, the plunger 54 is forced to bear against the housing 44 with the spring 55 being compressed under the hydraulic pressure. As a result of this, the plunger 54 and the holder 53 are disengaged from each other to thereby allow the rotor 52 to rotate relative to the housing 44.

FIG. 13 is a sectional view taken along a line X—X in FIG. 11 as viewed in the direction indicated by arrows, FIG. 14 is a fragmentary sectional view for illustrating displacement of a slide plate 71, FIG. 15 is a sectional view taken along a line Y—Y in FIG. 11 as viewed in the direction indicated by arrows, and FIG. 16 is a sectional view taken along a line Z—Z in FIG. 11 as viewed in the direction indicated by arrows.

Referring to FIGS. 13 to 16, the bolts 48 are received screwwise in the bolt holes 61, respectively. There are provided sector-like retarding hydraulic chambers 62 for rotating first to fourth vanes 64 to 67, respectively, in a retarding direction, as described hereinafter. Parenthetically, these vanes 64 to 67 are formed integrally with the rotor 52

Each of the retarding hydraulic chambers 62 is defined as enclosed by the rotor 52, the casing 45, the cover 47 and the housing 44 in correspondence to the first to fourth vanes 64 to 67, respectively. Further, the retarding hydraulic chambers 62 are hydraulically communicated with the first oil passage 42, being supplied with working oil from the first oil passage 42.

On the other hand, there are provided sector-like advancing hydraulic chambers 63 for rotating the first to fourth vanes 64 to 67 in an advancing direction. Each of the advancing hydraulic chamber 63 is defined, being enclosed by the rotor 52, the casing 45, the cover 47 and the housing 44 in correspondence to the first to fourth vanes 64 to 67, respectively. Further, the advancing hydraulic chambers 63 are hydraulically communicated with the second oil passage 43, being supplied with working oil from the second oil passage 43.

With the arrangement described above, the rotor 52 is displaced relative to the housing 44 in dependence on the amount of working oil supplied to the retarding hydraulic chamber 62 and the advancing hydraulic chamber 63, whereby volumes of the retarding hydraulic chamber 62 and the advancing hydraulic chamber 63 are caused to change correspondingly.

The first vane 64 protrudes radially outwardly from the rotor 52. The holder 53 is fitted to the first vane 64 at the side facing the housing 44 with a communicating oil passage 70 (described hereinafter) being formed in the cover 47. A guide groove 72 (described hereinafter) is formed in an intermediate portion of each of the communicating oil passages 70. The plunger oil passage 56 extends from a guide groove 72 to the housing 44 through the holder 53.

Similarly, each of the second to fourth vanes 65 to 67 is so formed as to protrude from the rotor 52 outwardly in the radially direction. Further, a tip seal 73 (described hereinafter) is provided in a portion of each of the first to fourth vanes 64 to 67, which seal is brought into contact with the casing 45.

A vane supporting member 68 constitutes a center portion of the rotor 52. Shoes 69 are provided, extending from the casing 45 inwardly in the radial direction. Each of the shoes 69 is provided with the bolt hole 61 for receiving screwwise the bolt 48 with the tip seal 49 being provided in the portion of the shoe 69, which seal is brought into contact with the vane supporting member 68.

The communicating oil passage 70 is communicated with the retarding hydraulic chamber 62 and the advancing hydraulic chamber 63 formed at both sides of the first vane 64, respectively. The slide plate 71 is movable within the guide groove 72 (described hereinafter) formed at an intermediate location of the communicating oil passage 70. At this juncture, it should be mentioned that the communicating oil passage 70 is divided or partitioned by the slide plate 71 so that no oil leakage can take place between the retarding hydraulic chamber 62 and the advancing hydraulic chamber 63.

With the arrangement described above, the slide plate 71 is displaced toward the advancing hydraulic chamber 63 when the hydraulic pressure within the retarding hydraulic chamber 62 is high (see FIG. 13). On the other hand, when the hydraulic pressure within the advancing hydraulic chamber 63 is high, the slide plate 71 is forced to move toward the retarding hydraulic chamber 62 (see FIG. 14).

As mentioned previously, the guide groove 72 is provided at an intermediate portion of the communicating oil passage 70, wherein an intermediate portion of the guide groove 72 is communicated to the plunger oil passage 56.

Thus, when the slide plate 71 moves toward the advancing hydraulic chamber 63 (see FIG. 13), the plunger oil passage 56 communicates with the retarding hydraulic chamber 62, whereas when the slide plate 71 moves toward the retarding hydraulic chamber 62 (see FIG. 14), the plunger oil passage 56 is set to the state communicating with the advancing hydraulic chamber 63.

The tip seal 73 is provided for each of the first to fourth vanes 64 to 67 for preventing leakage of oil between the vanes and the casing 45. Parenthetically, it should be mentioned that arrows shown in FIGS. 13, 15 and 16 indicate the direction in which the variable valve timing mechanism 40 as a whole is rotated by means of the timing belt 23 and others.

Next, operations of the variable valve timing mechanism 40 and the oil control valve 80 will be described in concrete.

At first, in the state in which the operation of the engine 1 is stopped, the rotor 52 assumes a maximum retard position (i.e., the position at which the rotor 52 has been rotated to maximum relative to the housing 44 in the retarding direction), as is shown in FIG. 13.

In the state described above, the hydraulic pressure of oil fed from the oil pump 91 to the oil control valve 80 is low (at the atmospheric pressure). Consequently, oil is supplied to neither the first oil passage 42 nor the second oil passage 43. Thus, no hydraulic pressure is applied to the plunger oil passage 56, as a result of which the plunger 54 is resiliently pressed against the holder 53 under the influence of the spring 55, as is shown in FIG. 11. In other words, the plunger 54 and the holder 53 engage with each other.

Upon starting of operation of the engine 1, the oil pump 91 is put into operation, whereby the hydraulic pressure supplied to the oil control valve 80 rises up. Consequently, hydraulic medium or oil is fed to the retarding hydraulic chamber 62 by way of the A-port 86. As a result of this, the slide plate 71 is caused to move toward the advancing hydraulic chamber 63 under the hydraulic pressure prevailing within the retarding hydraulic chamber 62, whereby hydraulic communication is established between the retarding hydraulic chamber 62 and the plunger oil passage 56. Under the circumstances, the plunger 54 is urged to displace toward the housing 44, which brings about disengagement between the plunger 54 and the rotor 52.

However, because the hydraulic pressure is applied to the advancing hydraulic chamber 63, each of the first to fourth vanes 64 to 67 remains in the state bearing on the shoes 69 in the retarding direction under hydraulic pressure. Accordingly, even when the plunger 54 is disengaged, the housing 44 and the rotor 52 are pressed against each other under the hydraulic pressure within the retarding hydraulic chamber 62, whereby vibration or shock can be suppressed to a possible minimum.

Now, when the B-port 87 is opened for rotating the rotor 52 in the advancing direction, working oil is supplied to the advancing hydraulic chamber 63 by way of the second oil passage 43. Consequently, hydraulic pressure is transmitted to the communicating oil passage 70 from the advancing hydraulic chamber 63, as a result of which the slide plate 71 is caused to move toward the retarding hydraulic chamber 62 under the hydraulic pressure.

When the slide plate 71 is moved as mentioned above, the plunger oil passage 56 is placed in hydraulic communication with the advancing hydraulic chamber 63 by way of the communicating oil passage 70, whereby hydraulic pressure is transmitted to the plunger oil passage 56 from the advancing hydraulic chamber 63. Under the hydraulic pressure mentioned above, the plunger 54 is forced to move toward the housing 44 against the spring force exerted by the spring 55, which results in disengagement between the plunger 54 and the holder 53.

In this manner, by adjusting the amount of working oil by opening/closing the A-port 86 and the B-port 87 in the state where the plunger 54 and the holder 53 are disengaged from each other, rotation of the rotor 52 can be advanced or retarded relative to the rotation of the housing 44 owing to the adjustment or control of the amount of working oil within the retarding hydraulic chamber 62 and the advancing hydraulic chamber 63.

Next, by referring to FIGS. 17 and 19, typical operation of the oil control valve 80 will be described. Incidentally, FIGS. 17 to 19 show operating states of the oil control valve 80 when the control current i issued from the electronic control unit 100 assumes different values, respectively.

More specifically, FIG. 17 shows operation state of the oil control valve 80 when the value of the control current i is ia (e.g. 0.1 ampere) smaller than a reference current value ib (e.g. 0.5 ampere).

Referring to FIG. 17, the spool valve element 82 is resiliently urged to the left-hand side of the housing 81 under the influence of the spring 84, whereby the oil supplying port 85 and the A-port 86 on one hand and the B-port 87 and the drain port 88b on the other hand are mutually communicated, as indicated by arrows.

In this state, working oil is fed to the retarding hydraulic chamber 62 while it is discharged from the advancing hydraulic chamber 63. Accordingly, the rotor 52 is forced to rotate in the counterclockwise direction relative to the housing 44 as indicated by arrow. Consequently, the phase of the intake-side cam shaft 19 retards relative to the intake timing pulley 21, whereby the intake valve 17 is placed in the retarding control state.

FIG. 18 shows the operation state of the oil control valve 80 when the value of the control current i is equal to the reference current value ib (e.g. 0.5 ampere). In the state illustrated in FIG. 18, the forces exerted by the linear solenoid 83 and the spring 84, respectively, and acting in opposite directions to each other are in balance, as a result of which the spool valve element 82 is maintained at a position where both the A-port 86 and the B-port 87 are closed.

Consequently, the retarding hydraulic chamber 62 and the advancing hydraulic chamber 63 are in the states in which working oil is neither supplied nor discharged. Accordingly, the rotor 52 will be sustained at the current position so long as the leakage of working oil does not occur from the retarding hydraulic chamber 62 and the advancing hydraulic chamber 63, whereby the phase relation between the intake timing pulley 21 and the intake-side cam shaft 19 can be maintained in the current state.

More specifically, FIG. 19 shows operation state of the oil control valve 80 when the value of the control current i is ic (e.g. 1.0 ampere) which is greater than the reference current value ib (e.g. 0.5 ampere).

Referring to FIG. 19, the spool valve element 82 is urged to the right-hand side of the housing 81 under the influence of the linear solenoid 83, whereby the oil supplying port 85 and the B-port 87 on one hand and the A-port 86 and the drain port 88a on the other hand are mutually communicated, as indicated by arrows.

In this state, because working oil is fed to the advancing hydraulic chamber 63 through the second oil passage 43, while being discharged from the retarding hydraulic chamber 62 through the first oil passage 42, the rotor 52 is forced to rotate in the clockwise direction relative to the housing 44 as indicated by arrow. Consequently, the phase of the intake-side cam shaft 19 is caused to advance relative to the intake timing pulley 21, whereby the intake valve 17 is placed in the advancing control state.

As can be seen from FIGS. 17 to 19, degree of hydraulic communication between the oil supplying port 85 and the A-port 86 or the B-port 87 as well as the degree of hydraulic communication between the drain port 88a or 88b and the A-port 86 or the B-port 87 can be controlled in dependence on the position of the spool valve element 82. In this conjunction, it is to be mentioned that the position of the spool valve element 82 and the value of the control current i flowing through the linear solenoid 83 bear a proportional relationship to each other.

FIG. 20 is a characteristic diagram for illustrating a relation between the value of the control current i flowing through the linear solenoid 83 and an actual valve timing change rate VTa. More specifically, there is graphically illustrated the rate of change of the actual valve timing (hereinafter also referred to as the actual valve timing change rate) designated by VTa as a function of the linear solenoid current i under predetermined operating condition of the engine 1. In FIG. 20, a positive or plus region of the actual valve timing change rate VTa represents the displacement in the advancing direction, while a negative or minus region of the actual valve timing change rate VTa corresponds to the region in which the displacement takes place in the retarding direction.

In FIG. 20, the electric current values ia to ic represent values of the linear solenoid current i corresponding to the positions of the spool valve element 82 shown in FIGS. 17 to 19, respectively. As can be seen from the figures, the value of the linear solenoid current i at which the actual valve timing Ta does not change (i.e., VTa=0) is only one current value ib at which the amount of working oil leaking from the hydraulic chambers 62 and 63 as well as the hydraulic pipe and the spool valve element 82 is in balance with the amount of working oil fed under pressure from the oil pump 91.

FIG. 21 is a characteristic diagram illustrating variations in the relation between the control current i flowing through the linear solenoid and the actual valve timing change rate VTa, wherein a solid line curve shows the characteristic curve when the discharge pressure of working oil is relatively high while a broken line curve represents the characteristic curve when the discharge pressure of working oil is relatively low. In this conjunction, it is to be mentioned that the discharge pressure of working oil can vary in dependence on the engine rotation number NE and the temperature such as the cooling water temperature W.

As can be seen in FIG. 21, the reference current value ib changes constantly in dependence on the change in the discharge pressure of working oil. For instance, when the discharge pressure of working oil becomes low, the reference current value ib increases. Additionally, the manner in which the reference current value ib and hence the characteristic curve vary differs from one to another product such as the spool valve element 82 due to unevenness in the dimensional factor or the like. When the discharge pressure of working oil becomes low, the rate of change in the actual valve timing (i.e., the value VTa) relative to the change of the linear solenoid current i will decrease.

Hereinafter, the linear solenoid current ib at which the actual valve timing Ta can remain constant will be referred to as the holding current ih.

Ordinarily, when the valve timing is to be advanced with reference to the holding current ih, the linear solenoid current i is set at a large value. By contrast, when the valve timing is to be retarded, the linear solenoid current i is set at a small value.

Next, valve timing detecting operation will be described by reference to FIG. 22 which is a timing chart illustrating a crank angle signal SGT, a cam angle signal SGCd in the most retarded phase and a cam angle signal SGCa in the advanced phase. Phase relations between the crank angle signal SGT and the cam angle signals SGCd and SGCa as well as the actual valve timing Ta can be arithmetically determined on the basis of the timing chart shown in FIG. 22.

The electronic control unit 100 is so designed or programmed as to measure a period T of the crank angle signal SGT as well as a phase difference time ΔTa intervening between the cam angle signal SGCa and the crank angle signal SGT (i.e., a time corresponding to difference in phase between the cam angle signal SGCa and the crank angle signal SGT).

Further, the most retarded valve timing Td is arithmetically determined on the basis of a phase difference time ΔTd and the period T of the crank angle signal SGT when the retard of the valve timing is at maximum in accordance with the following expression (1):

$$Td = (\Delta Td/T) \times 180[°CA] \tag{1}$$

The result of the calculation mentioned above is stored in a random access memory or RAM incorporated in the electronic control unit 100.

Further, the electronic control unit 100 is programmed to determine arithmetically the actual valve timing Ta on the basis of the phase difference time ΔTa, the period T of the crank angle signal SGT and the most retarded valve timing Td in accordance with the following expression (2):

$$Ta = (\Delta Ta/T) \times 180[°CA] - Td \tag{2}$$

Furthermore, the electronic control unit 100 is so programmed as to make the actual valve timing Ta converge to a desired (or target) valve timing To through a feedback control of the linear solenoid current i on the basis of timing deviation ER between the actual valve timing Ta and the desired valve timing To.

FIG. 23 is a block diagram showing schematically an internal configuration of the electronic control unit 100. As can be seen in the figure, the electronic control unit 100 includes a microcomputer 101.

Referring to FIG. 23, the microcomputer 101 is comprised of a CPU (central processing unit) 102 for executing various arithmetic operations, decision processings and others, a ROM (read-only memory) 103, a RAM (random access memory) 104 for storing temporarily the results of arithmetic operations (and/or other processings) executed by the CPU 102, an A/D (analogue-to-digital) converter 105 for converting an analogue signal to a digital signal, a counter 106 for counting the period of an input signal and/or other signals, a timer 107 for measuring a driving duration of an output signal, an output port 108 constituting an output interface, and a common bus 109 for interconnecting the various blocks or components 102 to 108.

Provided in association with the microcomputer 101 is a first input circuit 110 which shapes the waveforms of the crank angle signal SGT outputted from the crank angle sensor 6 and the cam angle signal SGC generated by the cam angle sensor 24, wherein the output signal of the first input circuit 110 is supplied to the microcomputer 101 as an interrupt command signal INT.

Every time the interruption occurs in response to the interrupt command signal INT, the CPU 102 reads the value of the counter 106 to store it in the RAM 104.

Further, the CPU 102 arithmetically determines the period T of the crank angle signal SGT (see FIG. 22) on the basis of difference between the counter value at the time point when the preceding crank angle signal SGT was inputted and the current counter value to thereby determine the engine rotation number (rpm) NE on the basis of the period T of the crank angle signal SGT.

Furthermore, the CPU 102 reads from the RAM 104 the counter value in response to the cam angle signal SGC as inputted, to thereby determine arithmetically a phase difference time ΔT on the basis of the difference or deviation from the counter value at the time point the crank angle signal SGT was inputted.

Further provided in association with the microcomputer 101 is a second input circuit 111 for fetching the cooling water temperature W from the water temperature sensor 12, the throttle opening degree θ from the throttle sensor 27 and the intake air flow Q from the intake air-flow sensor 28, respectively, wherein the output signal of the second input circuit 111 undergone noise elimination processing, amplification and other processings is supplied to the A/D converter 105 which converts the signals representing the cooling water temperature W, the throttle opening degree θ and the intake air flow Q into corresponding digital data, respectively. The digital output data signals of the A/D converter 105 are in turn inputted to the CPU 102.

The driving circuit 112 is designed to output a control signal for driving the fuel injector 30, while the driving circuit 113 is designed to output a control signal for driving the ignitor 11.

In response to the various input signals, the CPU 102 arithmetically determines the driving time or duration for the fuel injector 30 as well as the ignition timing for the ignitor 11 on the basis of the input signals, while driving the fuel injector 30 and the ignitor 11 by way of the output port 108, the driving circuits 112 and 113, respectively, for thereby controlling the fuel injection quantity and the ignition timing.

The current control circuit 114 is designed to control the linear solenoid current i of the oil control valve 80. To this end, the CPU 102 determines arithmetically the value of the linear solenoid current i of the oil control valve 80 on the basis of the various input signals mentioned above to thereby output through the output port 108 a duty signal corresponding to the linear solenoid current i for the oil control valve 80 on the basis of the result of time measurement performed by the timer 107.

On the other hand, the current control circuit 114 controls flowing of the linear solenoid current i through the linear solenoid 83 of the oil control valve 80 in accordance with the duty signal mentioned above, to thereby realize the control of the valve timing.

Further provided is a power circuit 115 which is designed to generate a constant voltage from the voltage of a battery 116 as supplied via a key switch 117. Thus, the microcomputer 101 can operate with the constant voltage supplied from the power circuit 115.

Next, operations of the CPU 102 will be described in concrete by referring to FIGS. 24 to 26 in which FIG. 24 is a timing chart when the actual holding current ih coincides with the reference value (0.5 ampere) and FIG. 25 is a timing chart when the actual holding current ih is deviated in the increasing direction from the reference value (0.5 ampere) in the system in which no integral control means is provided, while FIG. 26 is a timing chart in the case where the actual holding current ih is deviated in the increasing direction from the reference value (0.5 ampere) in the system equipped with the integral control means.

In general, the oil control valve 80 is so designed as to be capable of adjusting or regulating the quantity of working oil to be fed per unit time, whereas for the variable valve timing mechanism 40 which is subject to the control, the angular displacement is determined on the basis of the integrate quantity or amount of working oil as supplied. To this end, the variable valve timing mechanism 40 which is equipped with an integral element.

Thus, when the actual holding current ih of the oil control valve 80 coincides with the reference value (0.5 ampere), the control means incorporated in the electronic control unit 100 performs the proportional control in correspondence to the timing deviation ER between the desired valve timing To and the actual valve timing Ta by reference to the reference value (0.5 ampere) to thereby cause the actual valve timing Ta to converge to the desired valve timing To. In that case, the linear solenoid current i of the oil control valve 80 can be given by the following expression (3):

$$i = KP \times ER + 0.5 [A] \tag{3}$$

In the above expression (3), the gain KP corresponds to the proportional action. Further, the timing deviation ER appearing in the expression (3) can be determined in accordance with the following expression (4):

$$ER = To - Ta \tag{4}$$

In this conjunction, time-dependent changes of the desired valve timing To, the actual valve timing Ta and linear solenoid current i are, respectively, such as illustrated in FIG. 24.

At this juncture, it should be mentioned that the actual holding current ih for the oil control valve 80 can not always coincide with the reference value (0.5 ampere). Consequently, when the actual holding current ih becomes greater than the reference value (0.5 ampere), i.e., when the actual holding current ih deviates higher from the reference value, the control in accordance with the expression (3) will result in that the actual valve timing Ta does not converge to the desired valve timing To as illustrated in FIG. 25 and thus an offset ER1 continues to remain ultimately.

On the other hand, the control means incorporated in the electronic control unit 100 is designed to control the linear solenoid current i of the oil control valve 80 so that the timing deviation ER becomes zero. More specifically, referring to FIG. 25, the control means controls the linear solenoid current i in accordance with the undermentioned expression (3A) in order to make the offset ER1 to be zero.

$$i = KP \times ER1 + 0.5 [A] \tag{3A}$$

As can be seen from the above expression, the actual holding current ih is deviated in the increasing direction from the reference current value ib (0.5 ampere) by an amount "KP×ER1 (ampere)". Thus, the control means will try to converge the actual valve timing Ta to the desired valve timing To by supplying the current greater than the reference value (0.5 ampere) by "KP×ER1 (ampere)" in an effort to zeroing the offset ER1.

In actuality, however, the oil control valve 80 is in the state shown in FIG. 18 with both the A-port 86 and the B-port 87 being closed, which means that the offset ER1 is never cleared but continues to remain. In that case, the offset ER1 can be given by $$ER1=(ih-0.5[A])/KP \qquad (5)$$

Under the circumstances, the prior art system is so designed as to perform the integral control action in addition to the proportional control action according to the expression (3) so that no offset ER1 continues to exist.

In this case, the linear solenoid current i is given by the following expression (6):

$$i=KP \times ER + \Sigma Ki + 0.5[A] \qquad (6)$$

In the above expression (6), the integral term (total sum term) $\Sigma Ki$ represents the integral correcting value resulting from integration of increments/decrements calculated on the basis of the timing deviation ER in accordance with the following expression (7):

$$\Sigma Ki = \Sigma Ki(j-1) + Ki \times ER \qquad (7)$$

In the above expression (7), the gain Ki corresponds to the integral control action. Further, the integral term "$\Sigma Ki(j-1)$" represents the integral correcting value before determining the current integral value, while the term "$Ki \times ER$" corresponds to the current integral incrementation/decrementation value. Parenthetically, it should be mentioned that the gain Ki is set at a very small value so that the integral correcting value $\Sigma Ki$ does not fluctuate significantly even when the timing deviation ER making appearance transiently upon stepwise response increases, to thereby protect the control against instability.

Unless the offset ER1 exists between the desired valve timing To and the actual valve timing Ta, the integral correcting value $\Sigma Ki$ resulting finally from the integral control will satisfy the relation given by the following relation expression (8) for the holding current ih.

$$ih \approx \Sigma Ki + 0.5[A] \qquad (8)$$

FIG. 26 is a view illustrating temporal changes of the desired valve timing To, the actual valve timing Ta and the linear solenoid current i, respectively, in the state satisfying the condition given by the above expression (8). As can be seen, the timing offset or error or the timing deviation ER converges to zero.

Next, referring to FIGS. 27 to 29, description will be directed to the valve timing control performed by the conventional system equipped with integral control means in accordance with the expression (6).

FIGS. 27 and 28 are flow charts illustrating control programs stored in the ROM 103 (see FIG. 23). Further, FIG. 29 is a timing chart for illustrating the valve timing control operation executed in accordance with the programs illustrated in FIGS. 27 and 28. More specifically, in FIG. 29, changes of the valve timing, the linear solenoid current i and the integral correcting value $\Sigma Ki$ are illustrated.

The routine shown in FIG. 27 is executed by the CPU 102 periodically at a predetermined time interval (e.g. upon every lapse of 25 msec), while the routine shown in FIG. 28 is executed only once immediately upon closing of the key switch 117.

Referring to FIG. 27, the CPU 102 fetches the output signals from the various sensors mentioned hereinbefore in a step S1. In more concrete, the CPU 102 fetches the operation state signals of the engine such as the crank angle signal SGT, the cam angle signal SGC, the intake air flow Q, the throttle opening degree e and other from the crank angle sensor 6, the cam angle sensor 24, the intake air-flow sensor 28, the throttle sensor 27, the water temperature sensor 12 and other, respectively, to thereby arithmetically determine the phase difference time $\Delta T$.

Subsequently, the CPU 102 calculates the actual valve timing Ta represented by the angular displacement of the intake-side cam shaft 19 relative to the crank shaft 5 on the basis of the crank angle signal period T and the phase difference time $\Delta T$ in accordance with the expression (2) in a step S2.

Furthermore, the CPU 102 arithmetically determines or calculates the desired valve timing To on the basis of the engine rotation number NE, the intake air flow Q, the throttle opening degree θ and the cooling water temperature W in a step S3.

In succession, the CPU 102 calculates the timing deviation ER of the actual valve timing Ta from the desired valve timing To in accordance with the expression (4) in a step S4, which is then followed by calculation of the integral correcting value $\Sigma Ki$ in accordance with the expression (7) mentioned hereinbefore in a step S5.

In this conjunction, the term $\Sigma Ki(j-1)$ appearing in the expression (7) represents the integral correcting value $\Sigma Ki$ at a time point preceding to the current time point by 25 msec. Incidentally, the integral correcting value $\Sigma Ki$ is initialized to zero upon power-on of the electronic control unit 100 with the key switch 117 being closed (see step S8 in FIG. 28).

Finally, the linear solenoid current i for the oil control valve 80 is arithmetically determined in accordance with the expression (6) in a step S6, whereby a control signal (duty signal) corresponding to the linear solenoid current i is generated on the basis of the result of time measurement performed by the timer 107 in a step S7 to be subsequently outputted through the output port 108. The routine shown in FIG. 27 thus comes to an end.

The duty signal outputted from the microcomputer 101 via the output port 108 is inputted to the oil control valve 80 by way of the current control circuit 114 to be used for controlling the current flowing through the spool valve element 82 incorporated in the oil control valve 80 so that it coincides with the linear solenoid current i.

In this manner, the actual valve timing Ta is so controlled as to converge to or become equal to the desired valve timing To.

However, in the conventional valve timing control system for the internal combustion engine described above, the timing deviation ER will continue to exist in succession to the power-on of the electronic control unit 100 over a time period taken for the integral correcting value $\Sigma Ki$ to increase from zero (initialized state) to the value which can satisfy the condition given by the expression (8) mentioned hereinbefore. Consequently, during the period for which the timing deviation ER continues to exit, the operation performance inclusive of the exhaust gas discharge performance of the internal combustion engine will be degraded.

As will now be appreciated from the foregoing description, the conventional valve timing control system for the internal combustion engine suffers the problem that the operation performance as well as the exhaust gas discharge performance of the internal combustion engine is degraded because of the presence of the timing deviation ER of the actual valve timing Ta from the desired valve timing To during a time period immediately succeeding to the power-on of the electronic control unit 100, as can be seen in FIG. 29, because of initialization of the integral correcting value ΣKi to zero every time the key switch 117 is turned on or closed (step S8).

SUMMARY OF THE INVENTION

In the light of the state of the art described above, it is an object of the present invention to provide a valve timing control system for an internal combustion engine which is capable of making the actual valve timing converge rapidly or speedily to the desired valve timing even at a time point immediately after the power-on of the electronic control unit.

In view of the above and other objects which will become apparent as the description proceeds, there is provided according to a general aspect of the present invention a valve timing control system for an internal combustion engine, which system includes an intake valve and an exhaust valve driven in synchronism with rotation of the internal combustion engine for opening or closing an intake passage and an exhaust passage, respectively, which are communicated to a combustion chamber of the internal combustion engine, an engine operation state detecting means for detecting engine operation states of the internal combustion engine, a desired valve timing arithmetic means for arithmetically determining a desired valve timing for at least one of the intake valve and the exhaust valve in dependence on the engine operation state as detected, a variable valve timing mechanism for changing open/close timing of at least one of the intake valve and the exhaust valve, an actual valve timing detecting means for detecting an actual valve timing of at least one of the intake valve and the exhaust valve, an actual valve timing control means for generating a first control quantity for the variable valve timing mechanism so that a timing deviation of the actual valve timing from the desired valve timing becomes zero, an integral control means for arithmetically determining an integral correcting value for correcting the first control quantity by integrating the timing deviation, and a learning means for acquiring a learned value of a second control quantity required for holding the actual valve timing on the basis of the integral correcting value.

By virtue of the arrangement of the valve timing control system described above, the actual valve timing can be made to converge to the desired valve timing even at a time point immediately after the application of electric power to the electronic control unit (constituting the control means) to a great advantage.

In a preferred mode for carrying out the invention, the actual valve timing control means may be so designed as to correct the control quantity on the basis of the learned value.

Owing to the arrangement of the valve timing control system described above, the actual valve timing can be made to converge speedily to the desired valve timing immediately after the application of electric power to the electronic control unit.

In another preferred mode for carrying out the invention, the integral control means may be so arranged as to decrease the integral correcting value by an increment of the learned value while increasing the integral correcting value by an decrement of the learned value upon updating of the learned value.

With the arrangement of the valve timing control system mentioned above, the valve timing control can be carried out with enhanced stability.

In yet another preferred mode for carrying out the invention, the integral control means may be so designed as to initialize the integral correcting value on the basis of the learned value.

Owing to the arrangement of the valve timing control system mentioned above, the actual valve timing can be made to converge speedily to the desired valve timing immediately after the application of electric power to the electronic control unit.

In still another preferred mode for carrying out the invention, the valve timing control system mentioned above may further be so arranged as to include a battery connected to the valve timing control system for the internal combustion engine, a key switch inserted between the battery and the valve timing control system for supplying selectively electric power to the valve timing control system, and a backup power circuit inserted between the battery and the learning means for supplying electric power to the learning means. In that case, the learning means may hold the learned value, being supplied with electric power through the backup power circuit, even during a time period for which the key switch is opened, while the integral control means may be designed to initialize the integral correcting value upon closing of the key switch.

Owing to the arrangement of the valve timing control system described above, the actual valve timing can be made to converge speedily to the desired valve timing immediately after the application of electric power to the electronic control unit.

In a further preferred mode for carrying out the invention, the learning means may be so designed as to learn the integral correcting value as the learned value.

Owing to the arrangement of the valve timing control system described above, the actual valve timing can equally be made to converge speedily to the desired valve timing immediately after the application of electric power to the electronic control unit.

In a yet further preferred mode for carrying out the invention, the learning means may be so arranged as to arithmetically determine the learned value on the basis of a mean value of the integral correcting values.

With the arrangement of the valve timing control system, the learned value can positively be protected against variation nevertheless of abnormal change of the integral correcting value.

In a still further preferred mode for carrying out the invention, the learning means may be so arranged as to arithmetically determine the learned value on the basis of a mean value of the integral correcting values sampled at several time points after inversion of the increasing or decreasing direction (i.e., sign) of the integral correcting value.

With the arrangement of the valve timing control system mentioned above, the mean value can be determined with high accuracy within a short span of time, while erroneous learning which may occur when the integral correcting value changes only in one direction can be prevented.

In another preferred mode for carrying out the invention, the learning means may be so arranged as to reflect a part of the mean value of the integral correcting values to the learned value.

With the arrangement of the valve timing control system mentioned above, the learned value can be positively protected against variation nevertheless of occurrence of abnormal change in the mean value.

In yet another preferred mode for carrying out the invention, the learning means may be so designed as to set variably a ratio of reflection of the mean value of the integral correcting values reflected to the learned value such that the ratio of reflection decreases as the learning process proceeds.

With the arrangement of the valve timing control system described above, the actual valve timing can be made to converge speedily to the desired valve timing immediately after the application of electric power to the electronic control unit. Additionally, in the state where the learned value lies closer to the actual value as the learning process has progressed, the learned value can positively be protected against variation even when abnormal change occurs in the mean value.

In still another preferred mode for carrying out the invention, the learning means may be so arranged as to arithmetically determine the learned value on the basis of a mean value of the integral correcting values at every predetermined time interval.

With the arrangement of the valve timing control system mentioned above, the learned value can positively be protected against variation nevertheless of abnormal change in the integral correcting value.

In a further preferred mode for carrying out the invention, the learning means may be so designed as to perform filtering arithmetic processing for the integral correcting value to thereby determine arithmetically a filtered value resulting from the filtering arithmetic processing as the mean value.

With the arrangement of the valve timing control system mentioned above, the learned value can be positively protected against variation nevertheless of occurrence of abnormal change in the integral correcting value.

In a yet further preferred mode for carrying out the invention, the learning means may be so arranged as to determine a holding current required for holding the actual valve timing as the learned value of the control quantity relevant to the integral correcting value.

Owing to the arrangement of the valve timing control system described above, the actual valve timing can be made to converge to the desired valve timing immediately after the application of electric power to the electronic control unit.

In a still further preferred mode for carrying out the invention, the learning means may also be so arranged as to determine a current value obtained by subtracting a reference current value from a holding current required for holding the actual valve timing as the learned value of the control quantity relevant to the integral correcting value.

Owing to the arrangement of the valve timing control system described above, the actual valve timing can be made to converge to the desired valve timing immediately after the application of electric power to the electronic control unit.

In a further preferred mode for carrying out the invention, the learning means may also be so designated as to acquire the learned value when the desired valve timing is substantially constant and unless the timing deviation exceeds a predetermined value.

With the arrangement of the valve timing control system mentioned above, erroneous learning can be prevented in the state where the control quantity lies close to the actual value.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
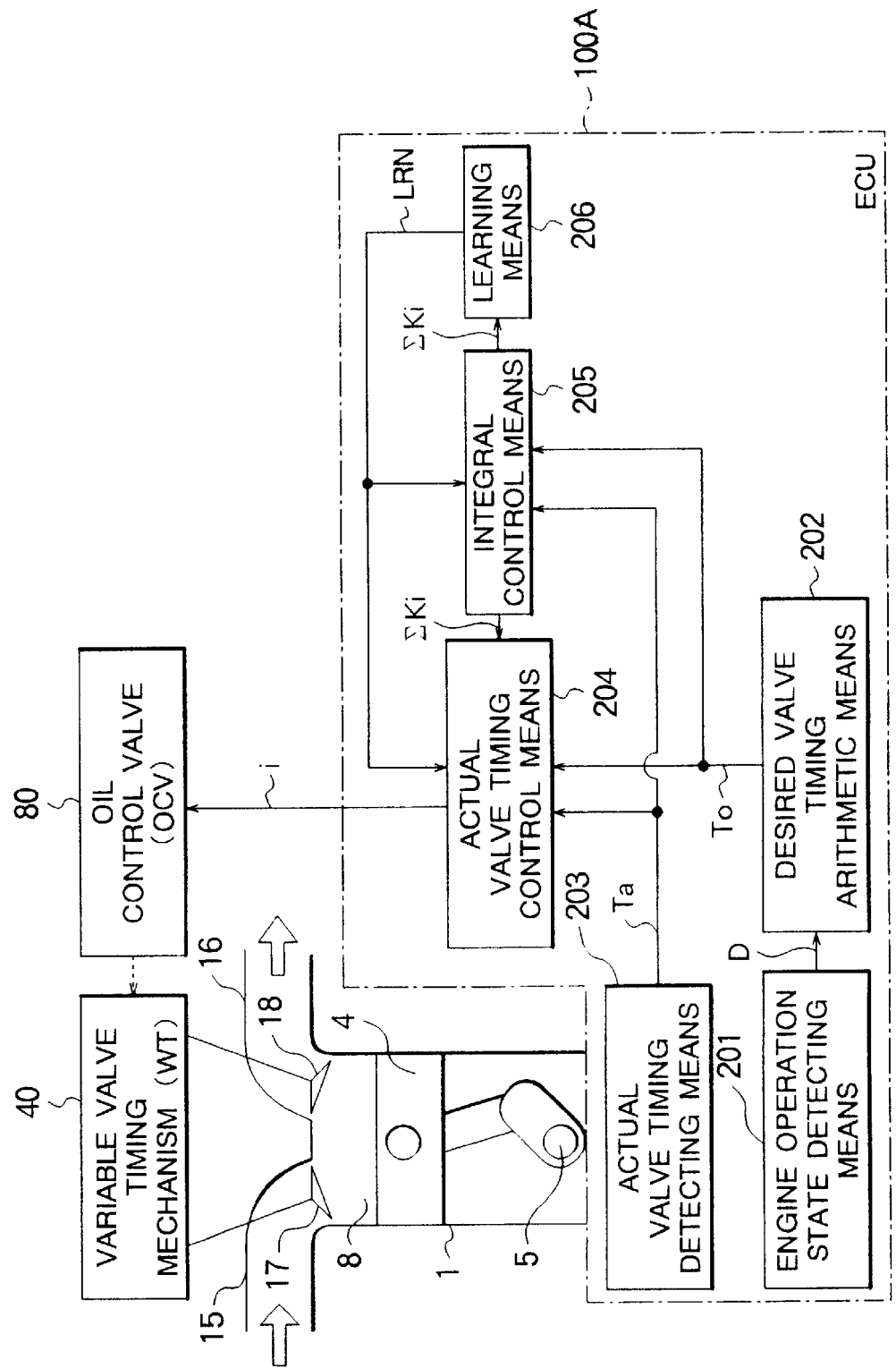
FIG. 1 is a functional block diagram showing conceptually and schematically a basic configuration of an internal combustion engine system equipped with a valve timing control system according to an embodiment of the present invention.

Now, the present invention will be described in detail in conjunction with what is presently considered as preferred or typical embodiments thereof by reference to the drawings. In the following description, like reference characters designate like or corresponding parts throughout the several views.

Embodiment 1

Now, the valve timing control system for the internal combustion engine according to a first embodiment of the present invention will be described.

FIG. 1 is a functional block diagram showing conceptually and only schematically a basic configuration of an internal combustion engine system equipped with the valve timing control system according to the first embodiment of the invention. More specifically, various functional modules which may be realized by programs executed internally of an electronic control unit 100A consisting a major part of the valve timing control system according to the invention are shown in FIG. 1.

Figure 10:
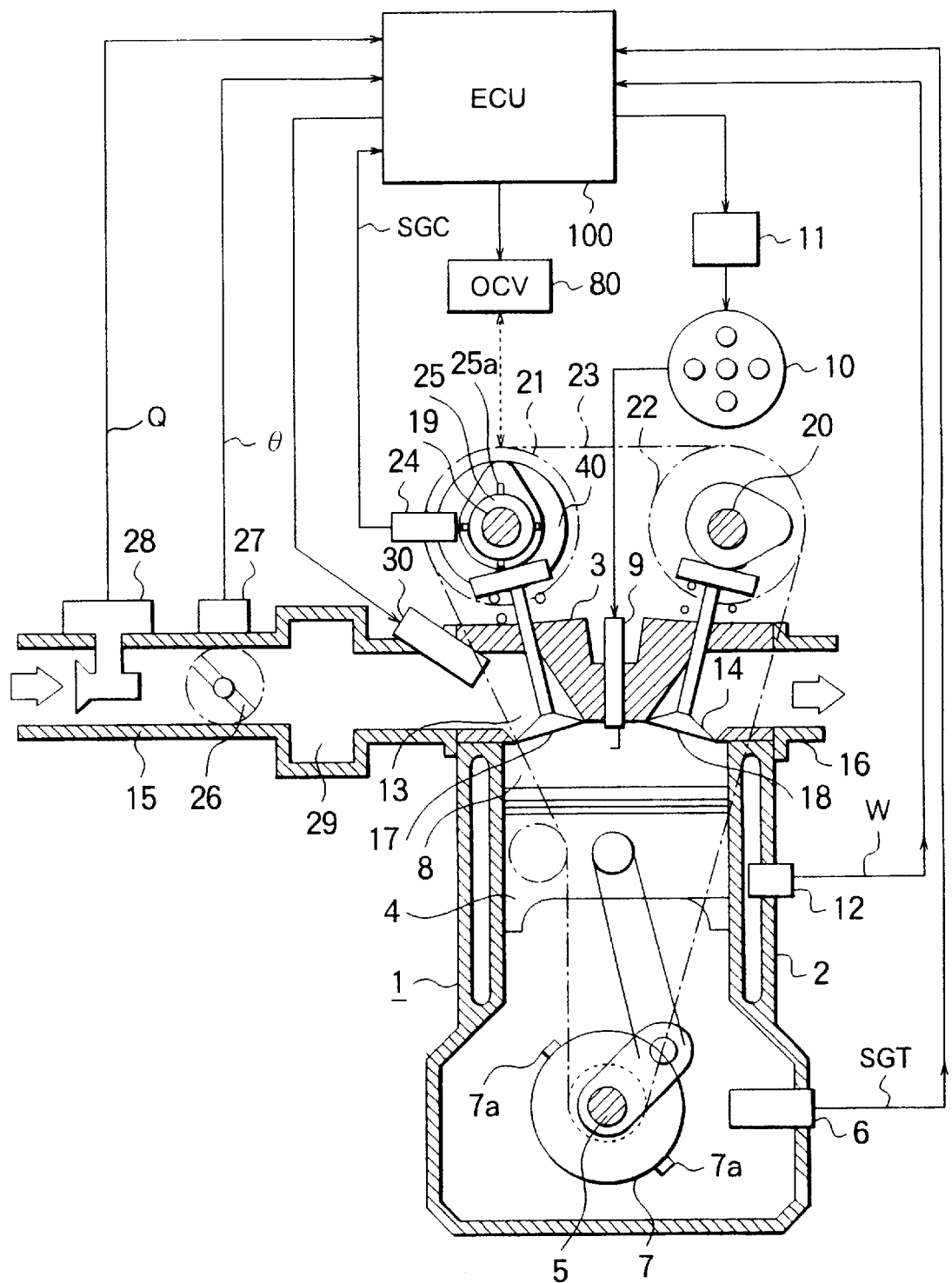
FIG. 10 is a schematic diagram showing generally a configuration of a gasoline engine system equipped with a conventional variable valve timing mechanism.
Figure 11:
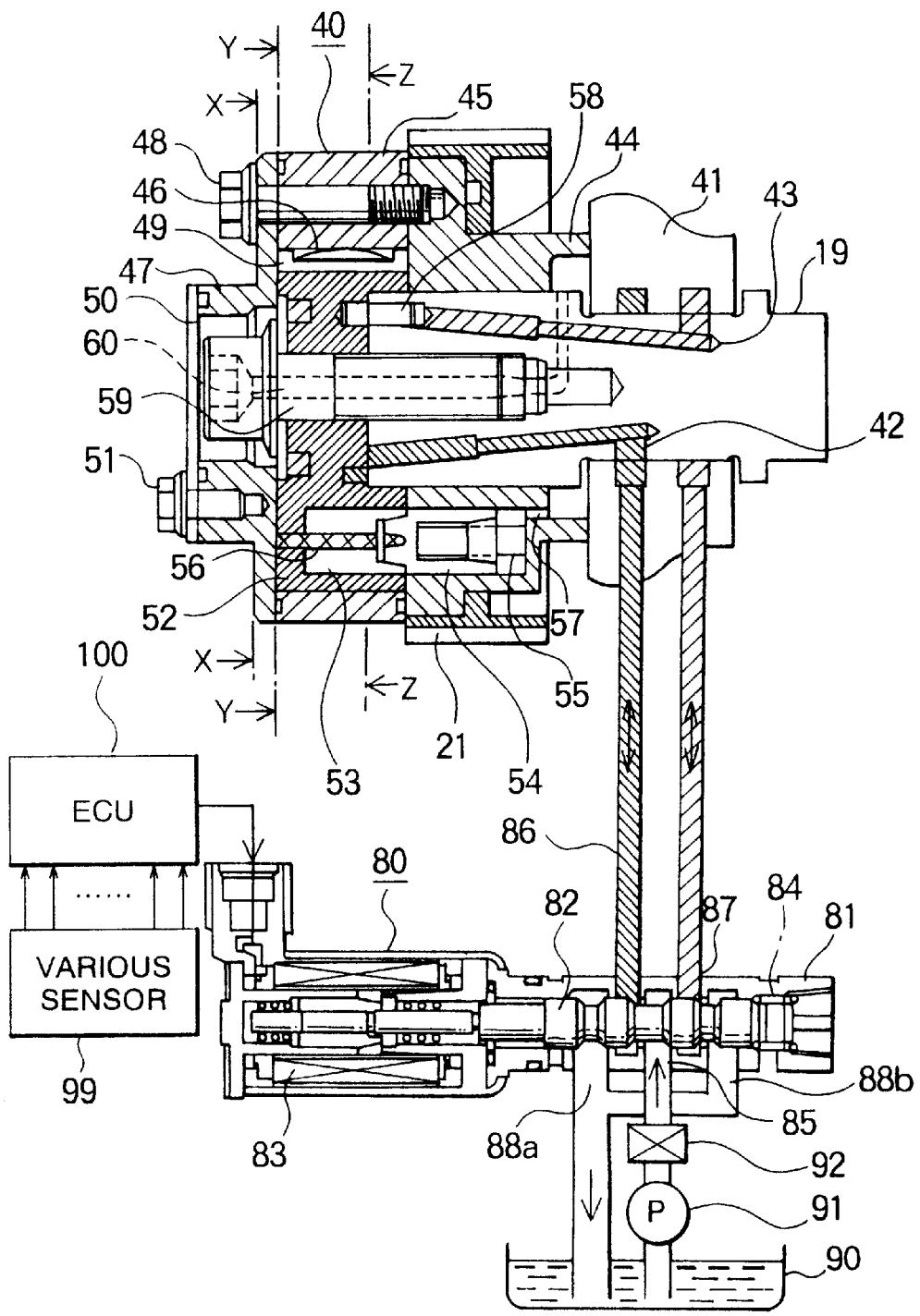
FIG. 11 is a side elevational view showing partially in section a structural arrangement around a variable valve timing mechanism and an oil control valve serving as a working oil supplying means in the valve timing control system shown in FIG. 10.
Figure 12:
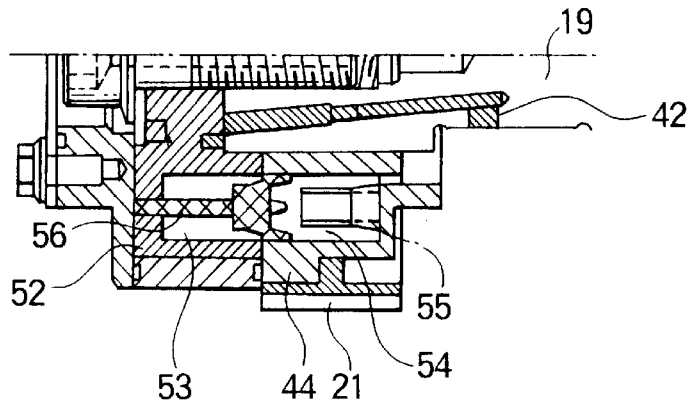
FIG. 12 is a fragmentary sectional view for illustrating operation of the variable valve timing mechanism shown in FIG. 11.
Figure 13:
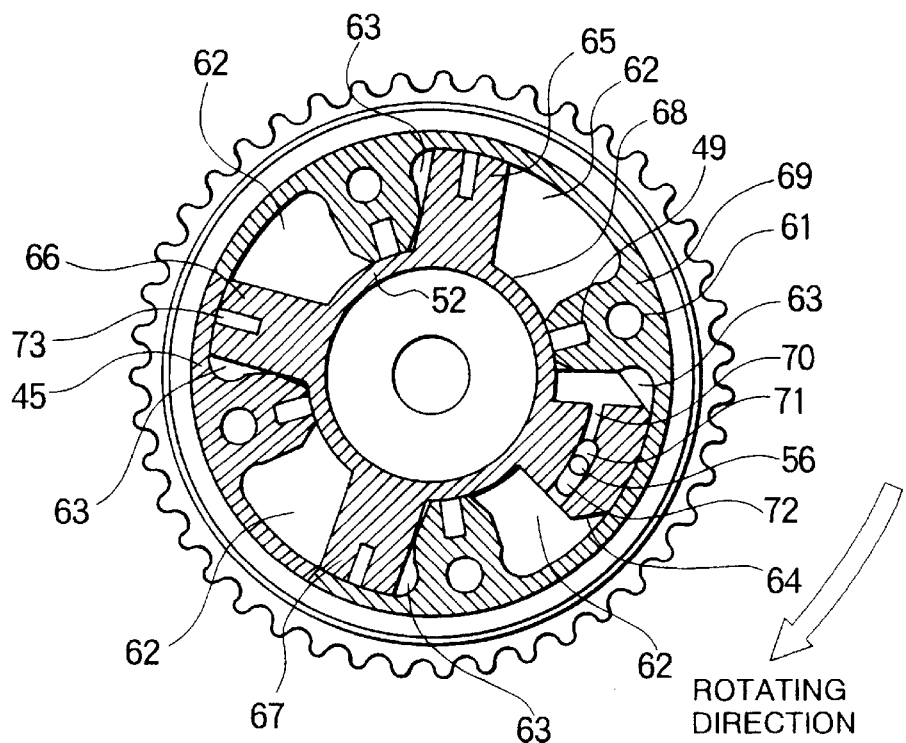
FIG. 13 is a sectional view taken along a line X—X in FIG. 11 and viewed in the direction indicated by arrows.
Figure 14:
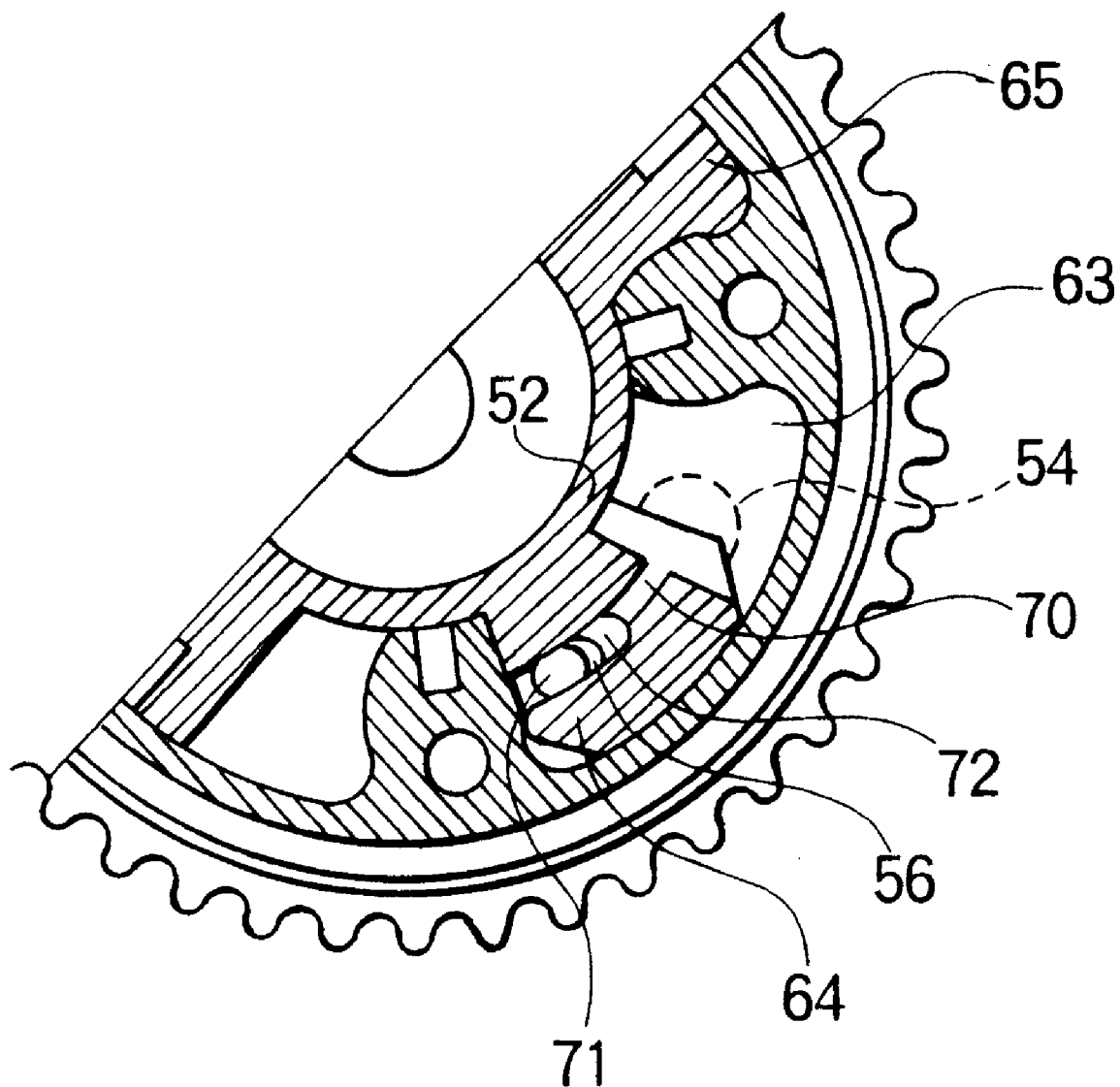
FIG. 14 is a fragmentary sectional view for illustrating displacement of a slide plate constituting a part of the variable valve timing mechanism shown in FIG. 11.
Figure 15:
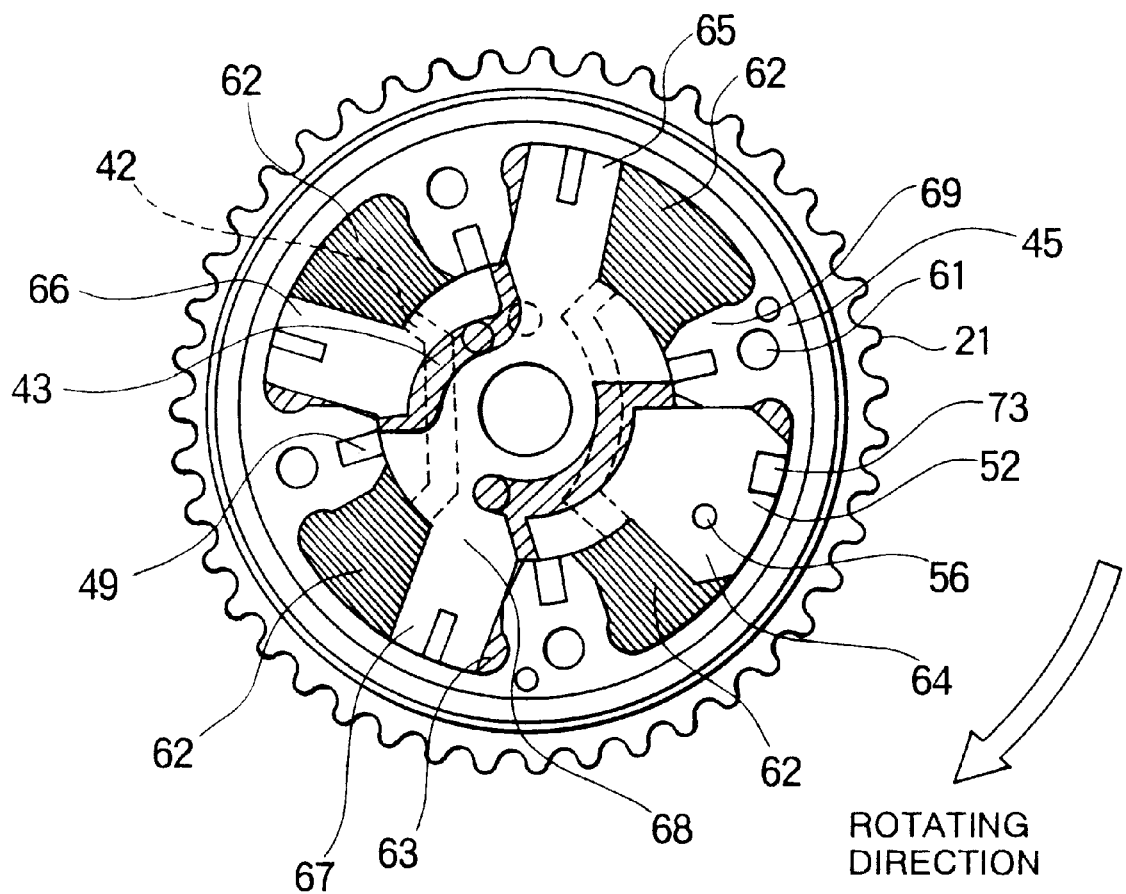
FIG. 15 is a sectional view taken along a line Y—Y in FIG. 11 and viewed in the direction indicated by arrows.
Figure 16:
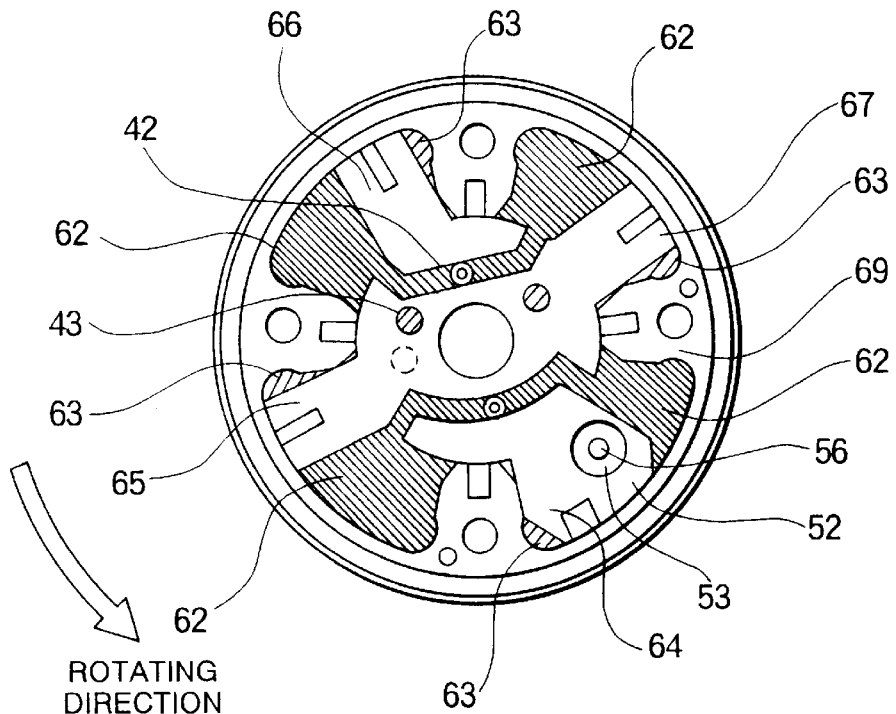
FIG. 16 is a sectional view taken along a line Z—Z in FIG. 11 and viewed in the direction indicated by arrows.
Figure 17:
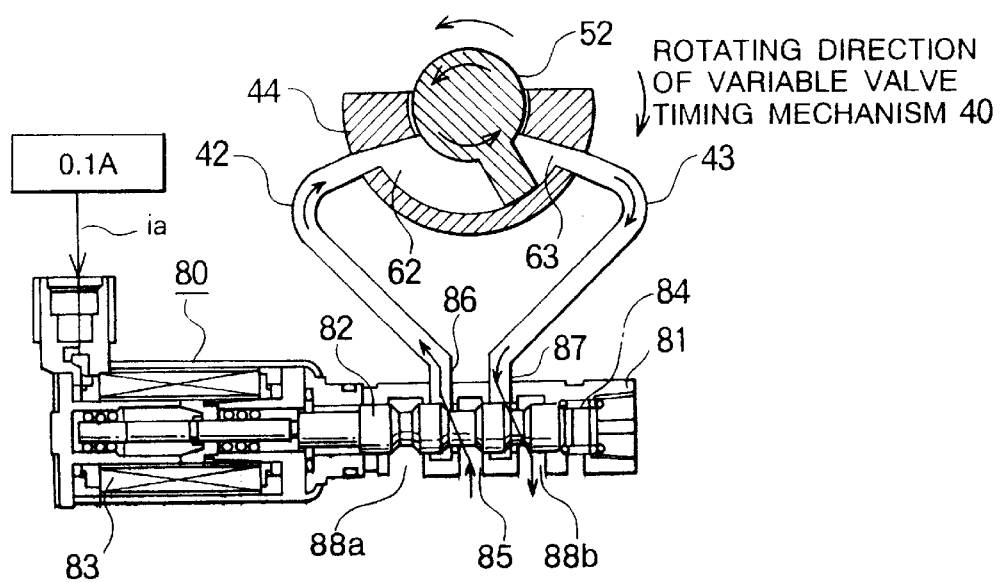
FIG. 17 is a view for illustrating operation of an oil control valve in the valve timing control system when a control current therefor is smaller than a reference value.
Figure 18:
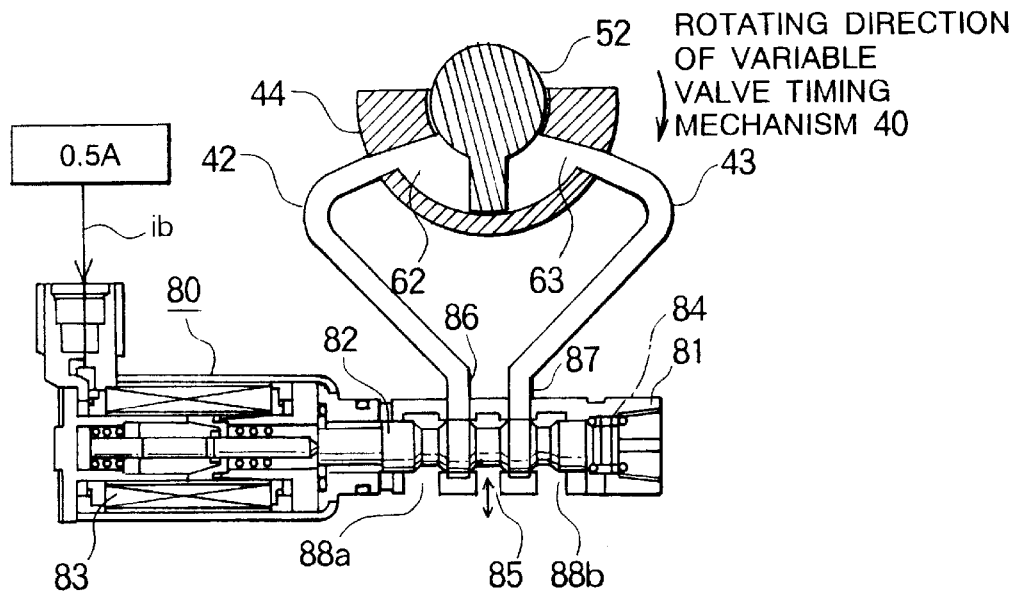
FIG. 18 is a view for illustrating operation of the oil control valve in the valve timing control system when the control current therefor is equal to the reference value.
Figure 19:
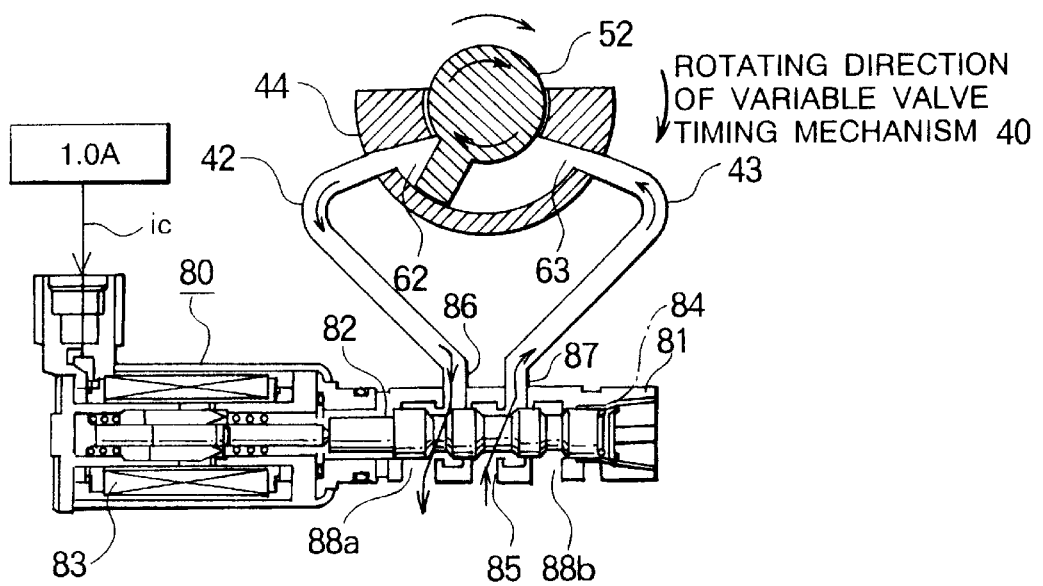
FIG. 19 is a view for illustrating operation of the oil control valve in the valve timing control system when the control current therefor is greater than the reference value.
Figure 20:
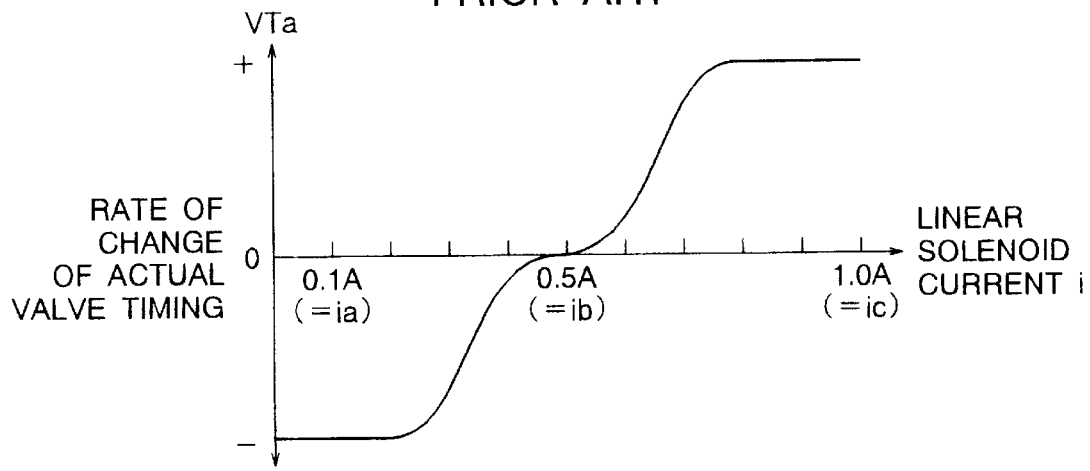
FIG. 20 is a characteristic diagram for illustrating a relation between a value of the control current flowing through a linear solenoid of the oil control valve and rate of change in an actual valve timing.
Figure 21:
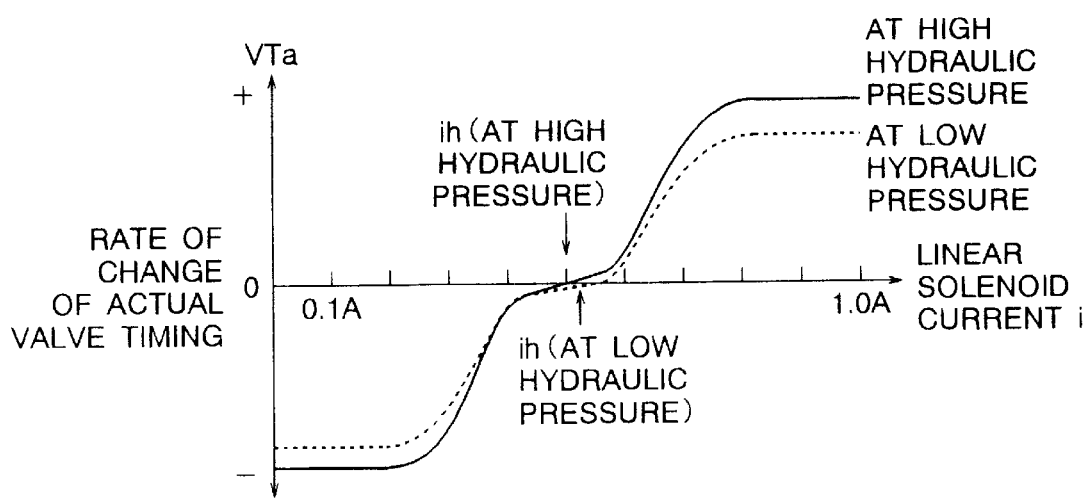
FIG. 21 is a characteristic diagram for illustrating variations in the relation between the control current flowing through the linear solenoid of the oil control valve and the rate of change in the actual valve timing.
Figure 22:
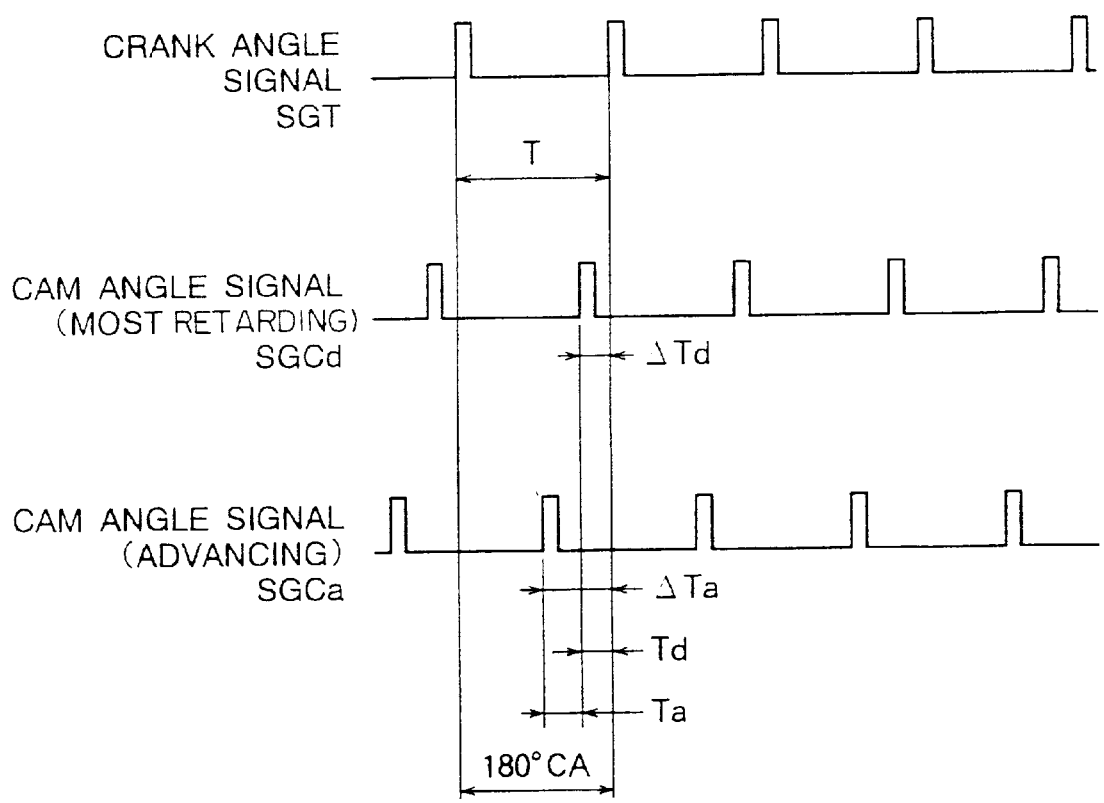
FIG. 22 is a timing chart for illustrating a crank angle signal, a cam angle signal in a retard phase and a cam angle signal in an advance phase.

At this juncture, it should be added that the arrangement including the variable valve timing system or mechanism to which the teaching of the invention incarnated in the instant embodiment can be applied is essentially same as or similar to that shown in FIG. 10, wherein difference is seen in several parts of the program executed by a microcomputer 101A incorporated in the electronic control unit 100A.

Furthermore, the basic operations of the variable valve timing system or mechanism as well as peripheral equipment thereof are essentially same as those described hereinbefore by reference to FIGS. 11 to 22. Accordingly, repeated description with regards to these respects will be unnecessary. Additionally, parts or components like as or equivalent to those mentioned hereinbefore (see FIG. 10) are designated by like reference characters and repeated description thereof will be omitted.

Referring to FIG. 10, the electronic control unit 100A is comprised of an engine operation state detecting means 201 for detecting the engine operation states D of the internal combustion engine on the basis of output signals of the various sensors (see FIG. 10), a desired valve timing arithmetic means 202 for arithmetically determining a desired valve timing To for at least one of the intake valve 17 and the exhaust valve 18 in dependence on the engine operation state D as detected, and an actual valve timing detecting means 203 for detecting an actual valve timing Ta for at least one of the intake valve 17 and the exhaust valve 18.

In addition, the electronic control unit 100A includes an actual valve timing control means 204 for generating a control quantity (a linear solenoid current i) for the variable valve timing mechanism 40 on the basis of a timing deviation ER of the actual valve timing Ta from the desired valve timing To, an integral control means 205 for arithmetically determining an integral correcting value ΣKi for correcting the first control quantity or the linear solenoid current i by integrating the timing deviation ER and a learning means 206 for deriving a learned value LRN of a second control quantity (holding current ih) required for holding the actual valve timing Ta on the basis of the integral correcting value ΣKi.

The actual valve timing control means 204 is adapted for correcting the linear solenoid current i on the basis of the learned value LRN.

The integral control means 205 is adapted to decrease the integral correcting value ΣKi by an increment of the learned value LRN, while increasing the integral correcting value ΣKi by an decrement of the learned value LRN upon updating of the learned value LRN.

The learning means 206 is adapted to arithmetically determine the learned value LRN on the basis of an average or mean value (or alternatively a filtered value described later on) of the integral correcting value ΣKi. By way of example, the learning means 206 may be so designed as to arithmetically determine the learned value LRN on the basis of a mean value of the integral correcting values ΣKi sampled at several time points after inversion of the increasing or decreasing direction (i.e., sign) of the integral correcting value ΣKi to the decreasing or increasing direction thereof. Additionally, the learning means 206 may also be so designed as to reflect a part of the mean value of the integral correcting values ΣKi to the learned value LRN and set variably the ratio of reflection of the mean value of the integral correcting values ΣKi reflected to the learned value LRN so that the ratio of reflection decreases as the learning process proceeds.

The learning means 206 includes a counter for the learning process (hereinafter also referred to as the learning counter) CLRN for acquiring the learned value LRN in a convergence status in which the desired valve timing To, for example, is substantially constant with the timing deviation ER being smaller than a predetermined value E1 inclusive.

The variable valve timing mechanism 40 is driven by the oil control valve 80 as described hereinbefore in conjunction with the conventional system, whereby at least one of the intake valve 17 and the exhaust valve 18 is controlled variably in respect to the value open/close timing.

Figure 2:
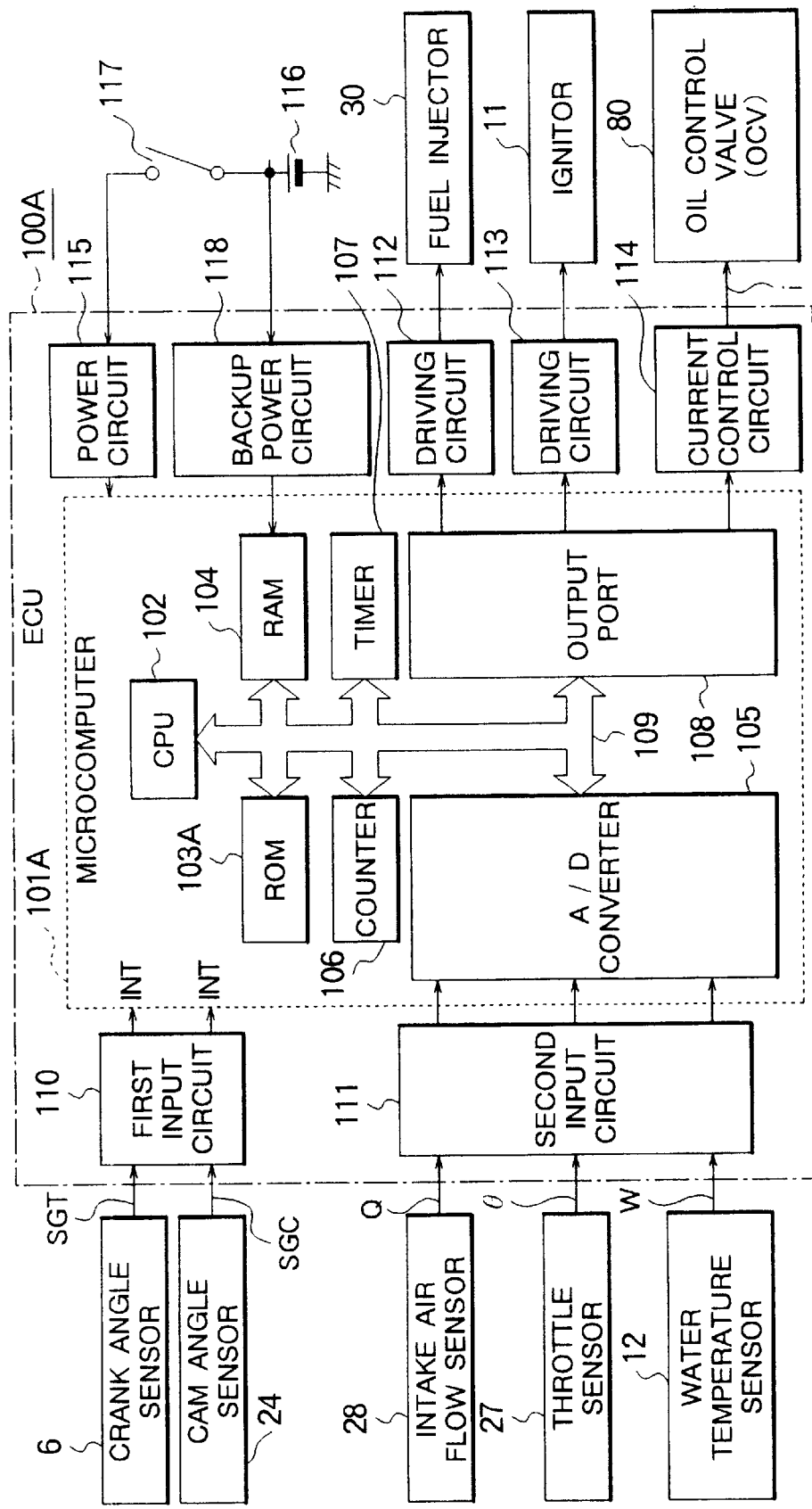
FIG. 2 is a block diagram showing an internal configuration of an electronic control unit incorporated in the valve timing control system for an internal combustion engine according to an embodiment of the invention.

FIG. 2 is a block diagram showing an internal configuration of the electronic control unit 100A. In FIG. 2, parts or components same as or equivalent to those described hereinbefore (see FIG. 23) are denoted by like reference characters and repeated description thereof will be omitted.

Figure 23:
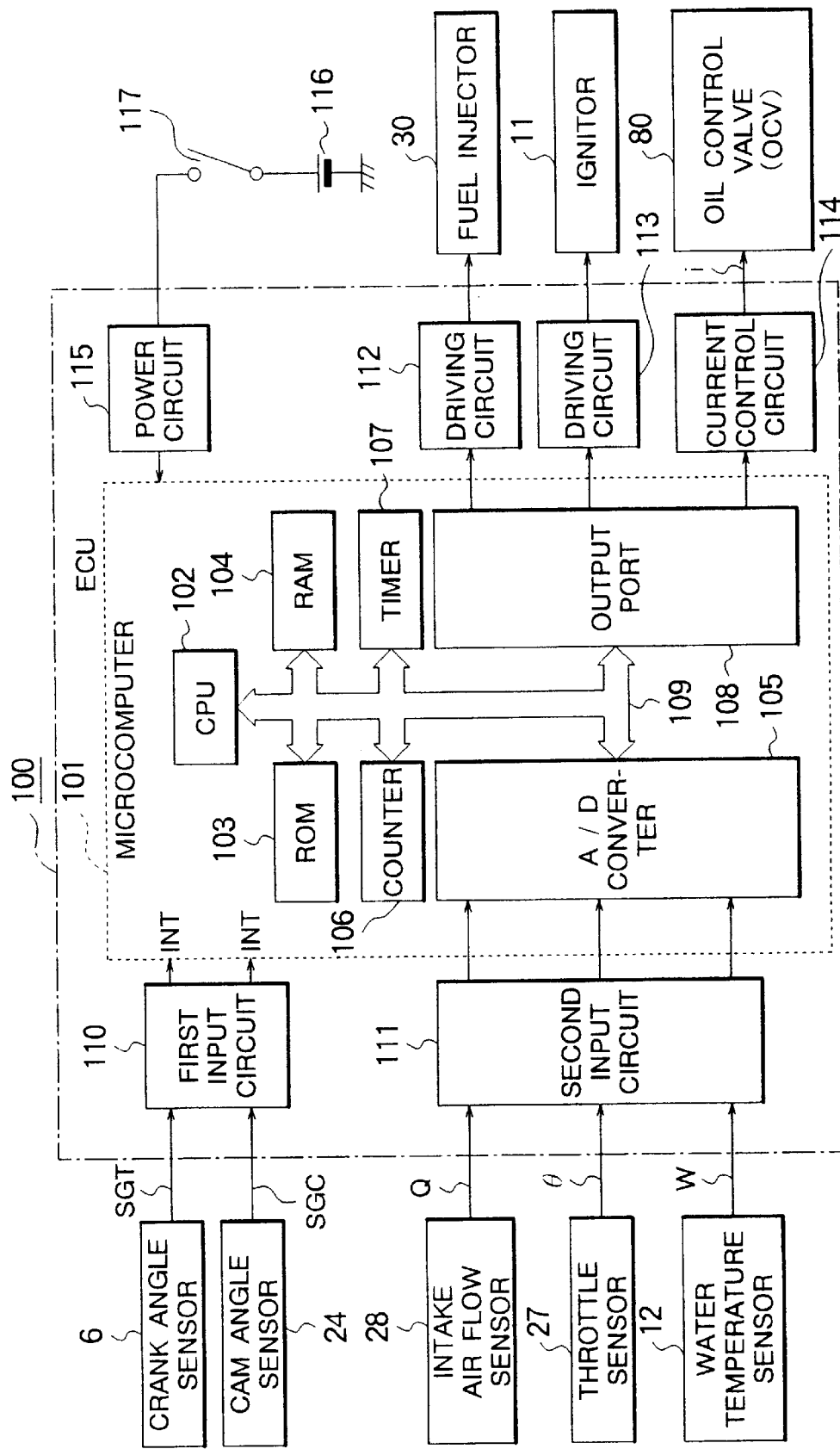
FIG. 23 is a block diagram showing schematically an internal configuration of an electronic control unit employed in the conventional valve timing control system known heretofore.
Figure 24:
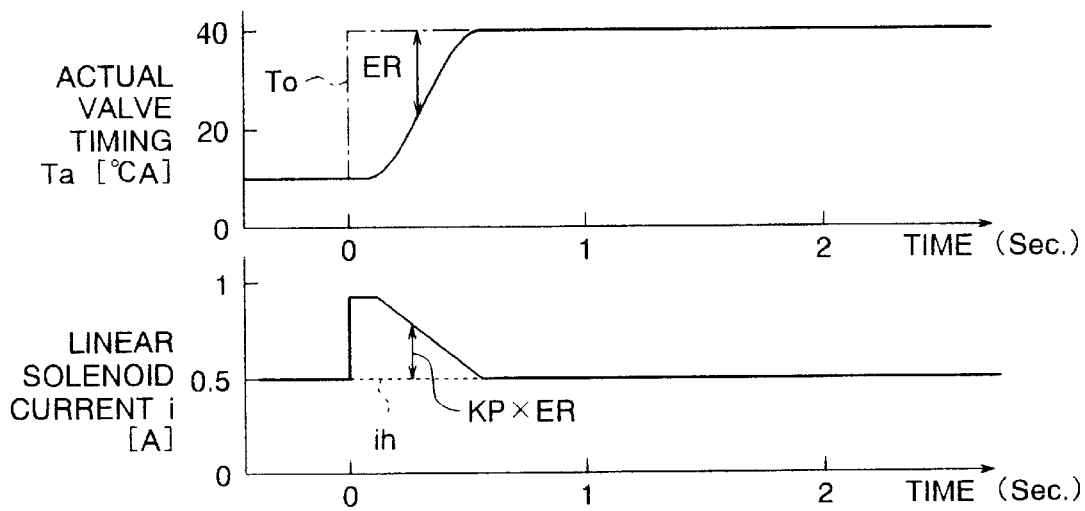
FIG. 24 is a timing chart for illustrating operation of the conventional valve timing control system.
Figure 25:
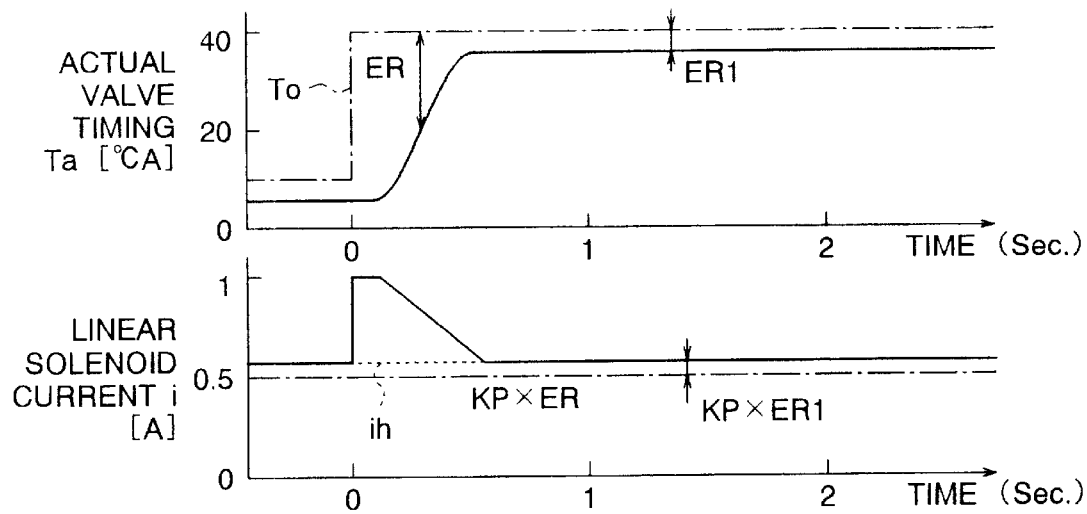
FIG. 25 is a timing chart for illustrating operation of the conventional valve timing control system.
Figure 26:
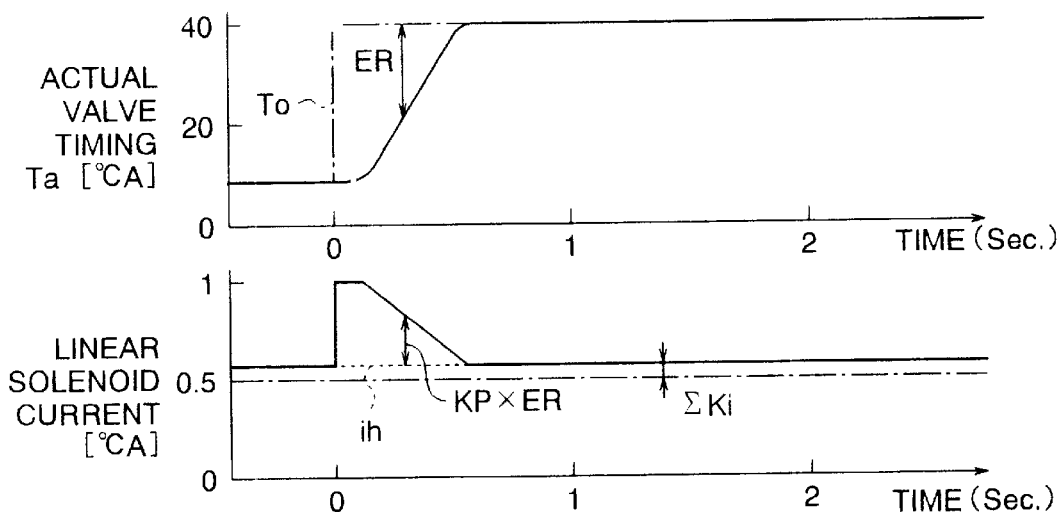
FIG. 26 is a timing chart for illustrating relation between an valve timing and a valve control current in the conventional valve timing control system equipped with an integral control means.

As can be seen from comparison of FIG. 2 with FIG. 23, the electronic control unit 100A differs from the electronic control unit 100 shown in FIG. 23 only in the respect that a backup power circuit 118 is additionally provided. Parenthetically, it should be mentioned that control program and data illustrated in FIG. 4 and described hereinafter are stored in a ROM (read-only memory) 103A incorporated in the microcomputer 101A.

The backup power circuit 118 is connected directly to an output terminal of a battery 116 without interposition of the key switch 117, whereby a constant voltage derived from the battery voltage is supplied to the RAM 104. Thus, the RAM 104 can operate at the constant voltage supplied from the backup power circuit 118, whereby the contents stored in the RAM 104 can be held even when the key switch 117 is in the opened state (off-state).

Figure 3:
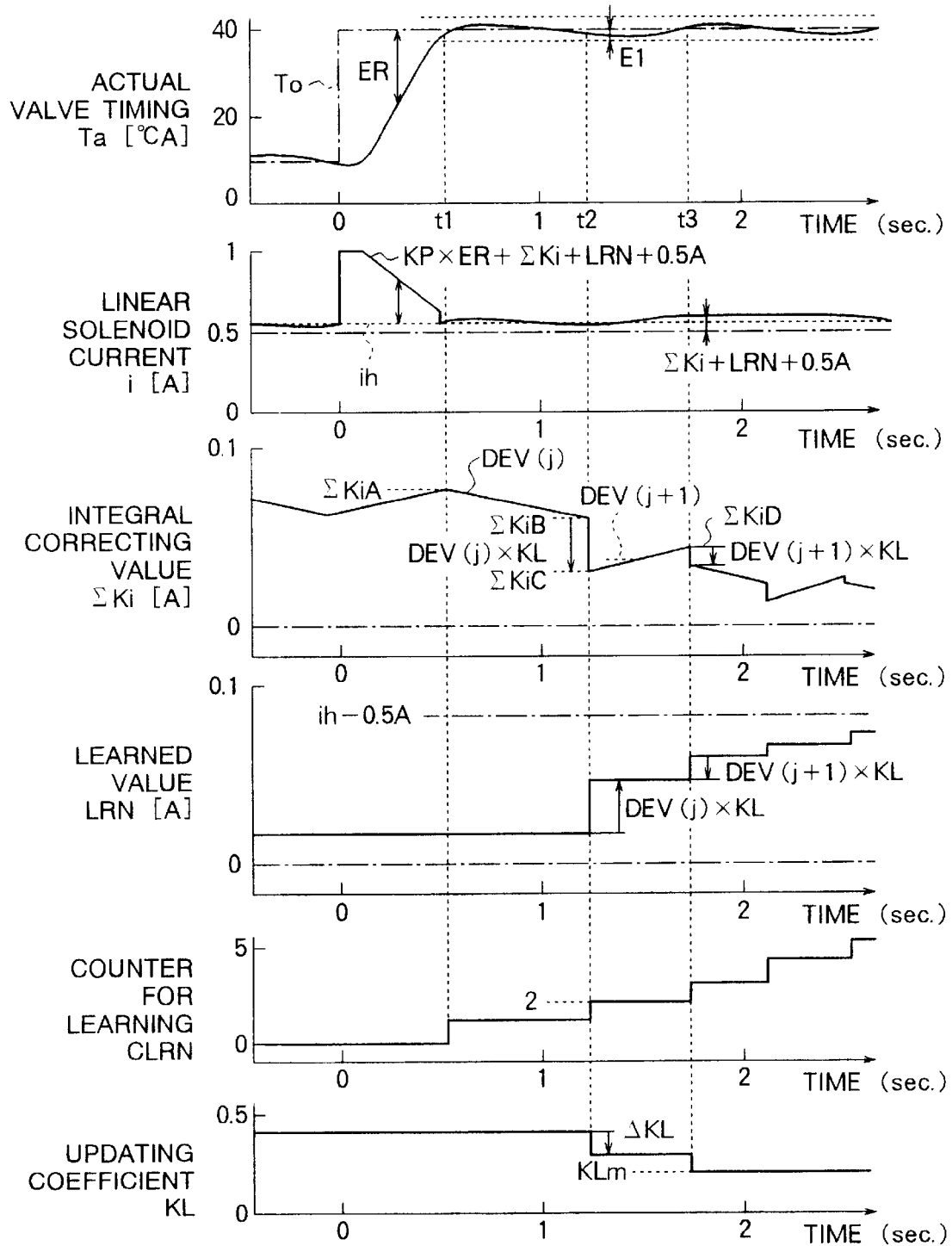
FIG. 3 is a timing chart illustrating operation of a valve timing control system according to a first embodiment of the invention.

Next, referring to the timing chart shown in FIG. 3, description will be directed to a holding current learning/control operation in the valve timing control system for the internal combustion engine according to the instant embodiment of the invention.

Referring to FIG. 3, when an absolute value of the timing deviation ER of the actual valve timing Ta from the desired valve timing To is equal to or greater than a predetermined value E1 (e.g. 1° in terms of the crank angle or CA in abbreviation), the linear solenoid current i can be arithmetically determined in accordance with the following expression (9):

$$i = KP \times ER + \Sigma Ki + LRN + 0.5 [A] \qquad (9)$$

The above expression (9) corresponds to the expression (6) mentioned previously in conjunction with the conventional system except that the learned value LRN of the holding current for the linear solenoid current i is additionally employed. The learning means 206 is designed to acquire the learned value LRN on the basis of the integral correcting value $\Sigma Ki$ for thereby allowing the integral correcting value $\Sigma Ki$ to converge substantially to zero, as will be described hereinafter in more detail. The learned value LRN converges substantially to a value (e.g. ih−0.5 A) which is obtained by subtracting the reference value from the actual holding current ih.

Further, the term $\Sigma Ki$ appearing in the expression (9) can be arithmetically determined in accordance with the following expression (10):

$$\Sigma Ki \leftarrow \Sigma Ki + \Delta Ki$$

when ER$\geq$0, and $$\Sigma Ki \leftarrow \Sigma Ki - \Delta Ki \qquad (10)$$

when ER<0

The above expression (10) corresponds to the expression (7) mentioned hereinbefore, wherein a incrementation/decrementation value $\Delta Ki$ of the integral correcting value $\Sigma Ki$ is set to a constant value (e.g. 0.1 mA) regardless of the magnitude of the timing deviation ER.

On the other hand, when the absolute value of the timing deviation ER is smaller than a predetermined value E1, the linear solenoid current i can be arithmetically determined in accordance with the following expression (11):

$$i = \Sigma Ki + LRN + 0.5 [A] \qquad (11)$$

The above expression (11) corresponds to the expression (9) mentioned hereinbefore except that the proportional control value (KP×ER) is deleted.

In more concrete, the state in which the actual valve timing Ta has converged substantially to the desired valve timing To (i.e., the state in which |ER|<E1) represents the state in which the actual valve timing Ta is controlled stably with reference to the desired valve timing To. In that case, the proportional control value (KP×ER) based on the timing deviation ER is invalidated to allow the actual valve timing Ta to be varied only through the integral control action ($\Delta Ki$).

Through the control procedure mentioned above, the actual valve timing Ta is so changed as to converge to the desired valve timing To in dependence on the deviation from the desired valve timing To.

However, in the convergence status in which the desired valve timing To is essentially constant and the absolute value of the timing deviation ER is smaller than the predetermined value E1, the linear solenoid current i determined in accordance with the expression (11) mentioned previously can be regarded as indicating essentially the actual holding current ih. Accordingly, the learning means 206 executes the following learning procedure for acquiring the learned value LRN on the basis of the integral correcting value $\Sigma Ki$.

At first, the learning means 206 increments the learning counter CLRN by "1" (one) at a time point t1 at which the sign of the timing deviation ER is inverted in succession to the state where the actual valve timing Ta has substantially converged to the desired valve timing To.

In that case, when the value of the learning counter CLRN is "1", the integral correcting value $\Sigma KiA$ at the time point t1 is stored as a peak value Pi of the integral correcting value $\Sigma Ki$.

The value of the learning counter CLRN is reset to zero unless the desired valve timing To is constant or unless the absolute value of the timing deviation ER is smaller than the predetermined value E1.

Thus, the value of the learning counter CLRN indicates the number of times the sign FER of the timing deviation ER has undergone inversion after the convergence status has been attained.

When the convergence status continues to exist and when the sign FER of the timing deviation ER is inverted at a time point t2 in succession to the time point t1, the learning means 206 increments additionally the learning counter CLRN by "1" (one).

In that case, when the value of the learning counter CLRN is equal to or greater than "2", a mean value ($\Sigma KiA + \Sigma KiB$)/2 of the integral correcting values $\Sigma KiA$ and $\Sigma KiB$ at the time point t2 as well as the preceding peak value Pi of the integral correcting value $\Sigma Ki$ (=$\Sigma KiA$) is stored as an integral correcting value deviation (i.e., deviation of the integral correcting value) DEV.

Besides, in order to reflect a part of the integral correcting value deviation DEV onto the learned value LRN, the integral correcting value deviation DEV is multiplied by an updating coefficient KL ($\leq 1$) to thereby arithmetically determine the product (DEV×KL) which is then added to the learned value LRN.

To say in another way, when the sign FER of the timing deviation ER is inverted twice or more in the state in which the convergence continues, the learned value LRN is updated upon every inversion of the sign FER of the timing deviation ER. Consequently, the peak value Pi of the integral correcting value ΣKi stored at the time point t2 assumes a value ΣKiC shown in FIG. 3.

Similarly, when the sign FER of the timing deviation ER is again inverted at a time point t3, the learning means 206 increments additionally the count of the learning counter CLRN by "1" (one) and thus a mean value "(ΣKiC+ΣKiD)/2" between the integral correcting value ΣKiD at the time point t3 and the preceding peak value Pi of the integral correcting value ΣKi (=ΣKiC) is stored as the integral correcting value deviation DEV.

Besides, in order to reflect a part of the integral correcting value deviation DEV onto the learned value LRN, the integral correcting value deviation DEV is multiplied by an updating coefficient KL to thereby add the product to the learned value LRN.

At this juncture, it should be noted that the updating coefficient KL is initialized to a predetermined value KLo (e.g. 1.0) upon every power-on of the electronic control unit 100A with the key switch 117 being closed. Thus, the learned value LRN can speedily be made to converge closely to the actual holding current ih immediately after closing of the key switch 117 (i.e., at the time point at which the probability of the learned value LRN being different from the actual holding current ih is high).

The updating coefficient KL is decremented by a predetermined value ΔKL (e.g. 0.1) every time the learned value LRN is updated until the lower limit value KLm (e.g. 0.2) has been attained.

Thus, although the ratio at which the integral correcting value deviation DEV is reflected onto the learned value LRN is high at a time point immediately following the closing or turn-on of the key switch 117, the above-mentioned ratio decreases gradually as the learning process progresses.

In the state in which the learned value LRN becomes close to the holding current ih as the learning process progresses, it is possible to suppress variation of the learned value LRN even if the integral correcting value ΣKi should vary abnormally.

Furthermore, since the product obtained from multiplication of the integral correcting value deviation DEV by the updating coefficient KL is subtracted from the integral correcting value ΣKi upon updating of the learned value LRN, a sum of the integral correcting value ΣKi and the learned value LRN can remain unchanged before and after the updating of the learned value LRN.

In that case, the integral correcting value ΣKi undergone the subtraction such as, for example, the integral correcting value ΣKiC shown in FIG. 3 is stored as the peak value Pi of the integral correcting value ΣKi at the time point t2 so as to be made use of in the arithmetic determination of the integral correcting value deviation DEV upon succeeding inversion of the sign of the timing deviation ER at a time point t3.

By repeating the operation described above, the learned value LRN can converge speedily to a value (ih−0.5 ampere) obtained by subtracting the reference value from the actual holding current ih with the integral correcting value ΣKi converging to zero.

Further, because the learned value LRN is stored and held within the RAM 104 which is continuously supplied with electric power from the backup power circuit 118 during the time period for which the key switch 117 is opened, the actual valve timing Ta can be made to converge speedily to the desired valve timing To even at a time pint immediately after the closing of the key switch 117.

Parenthetically, the learned value LRN is initialized to zero immediately after the battery 116 is connected.

Figure 4:
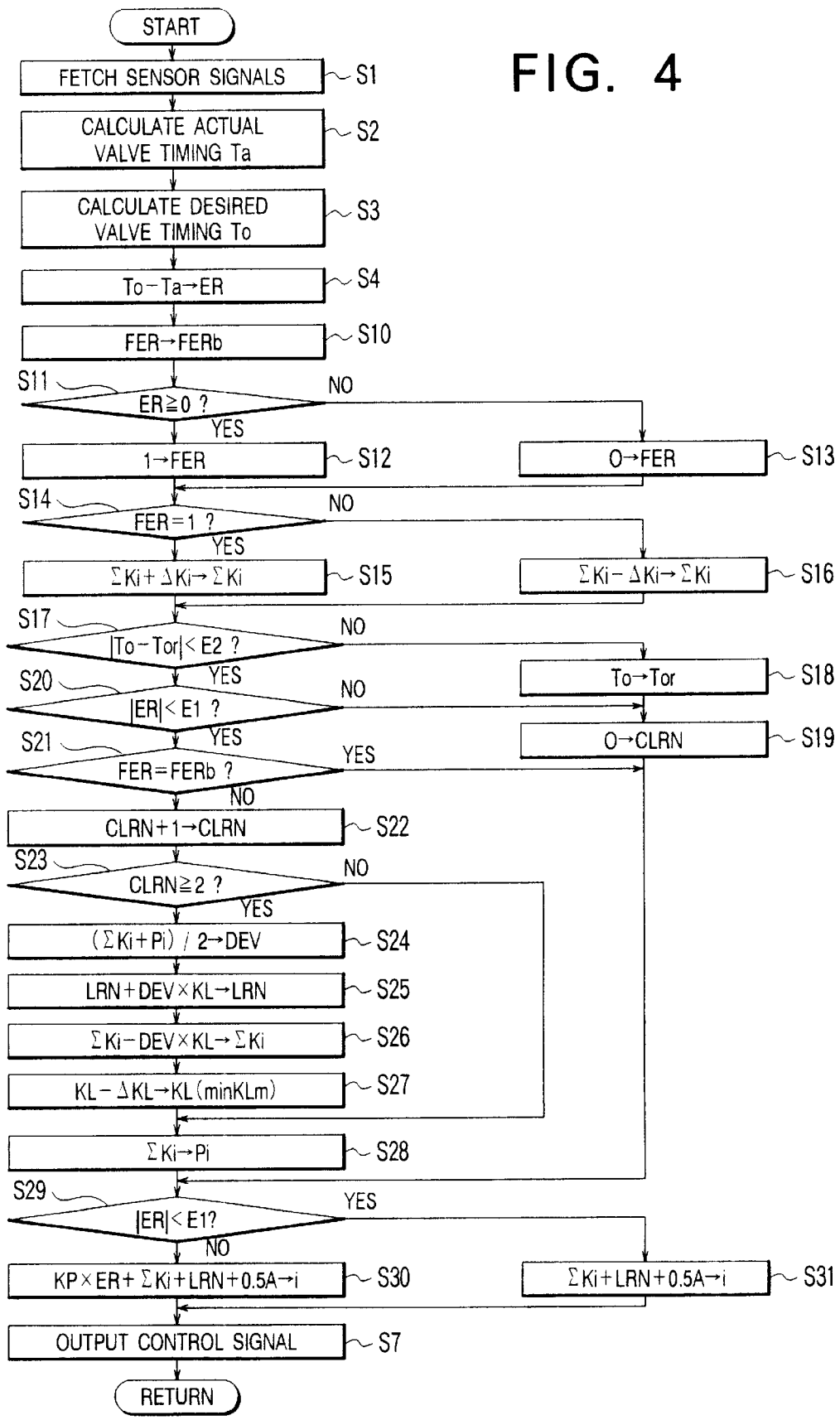
FIG. 4 is a flow chart for illustrating a program executed by a CPU of a microcomputer incorporated in an electronic control unit constituting a major part of the valve timing control system according to the invention.
Figure 5:
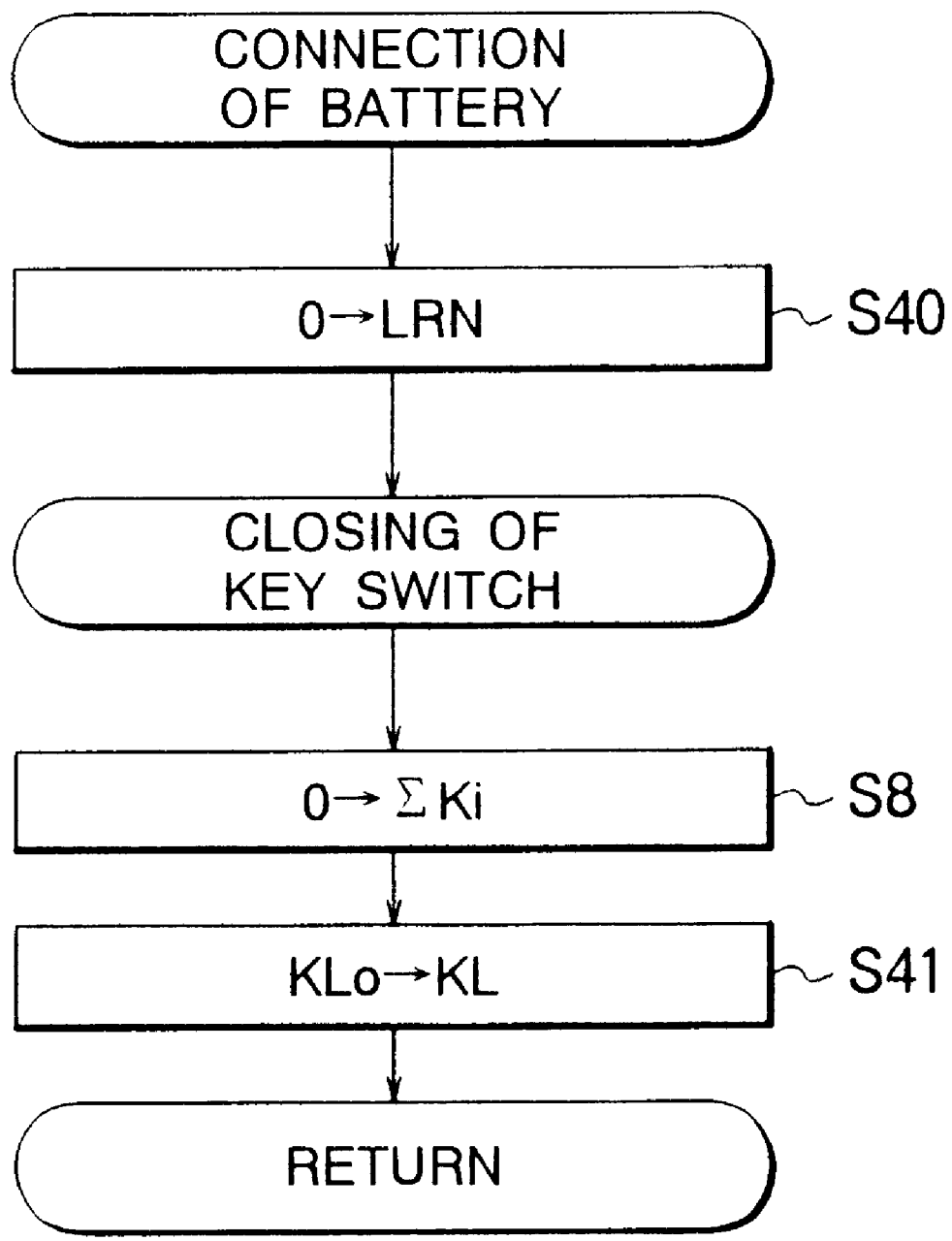
FIG. 5 is a flow chart for illustrating operation of the valve timing control system according to the first embodiment of the invention.

Next, referring to flow charts shown in FIGS. 4 and 5, the operations mentioned above will be elucidated in more concrete.

FIG. 4 illustrates in a flow chart a program executed by the CPU 102 incorporated in the microcomputer 101A (see FIG. 2) periodically at a time interval of 25 msec. (i.e., upon every lapse of 25 msec.).

Figure 27:
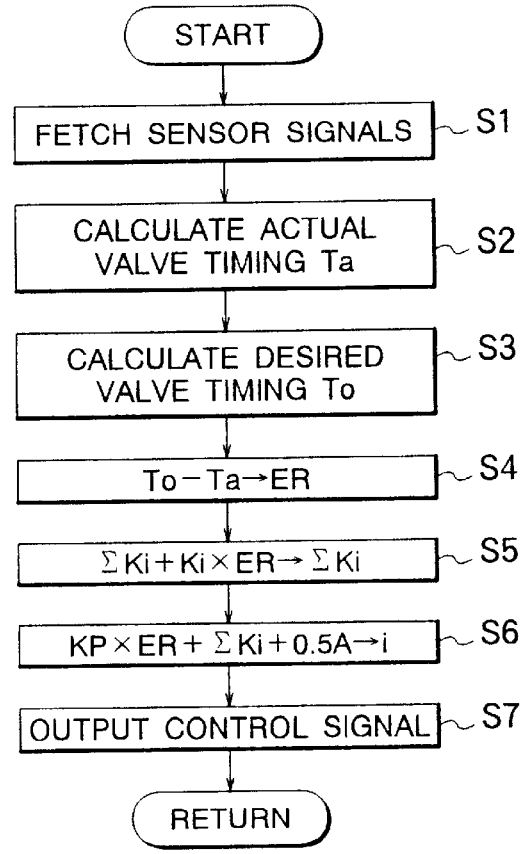
FIG. 27 is a flow chart for illustrating operation of the conventional valve timing control system for the internal combustion engine known heretofore.

As can be seen in FIG. 4, the steps S5 and S6 described hereinbefore by reference to FIG. 27 are substituted for by steps S10 to S31. Parenthetically, processing steps same as or equivalent to those described hereinbefore are designated by like reference characters and repeated description thereof is omitted.

Figure 28:
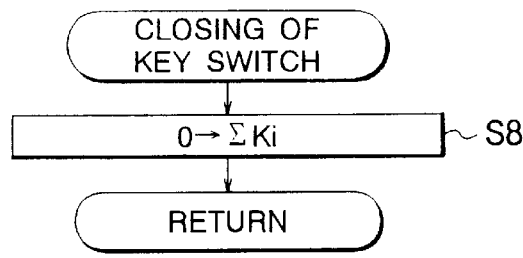
FIG. 28 is a flow chart for illustrating operation of the conventional valve timing control system for the internal combustion engine known heretofore.
Figure 29:
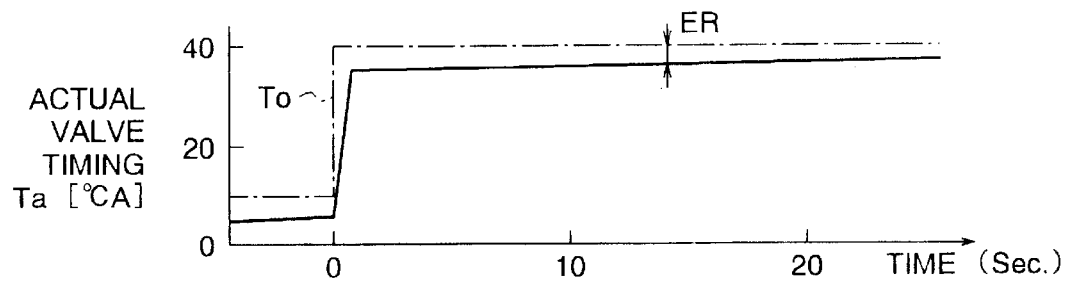
FIG. 29 is a timing chart for illustrating relations among an actual valve timing, a linear solenoid current and an integral correcting value which are used in the conventional valve timing control system.
Figure 29:
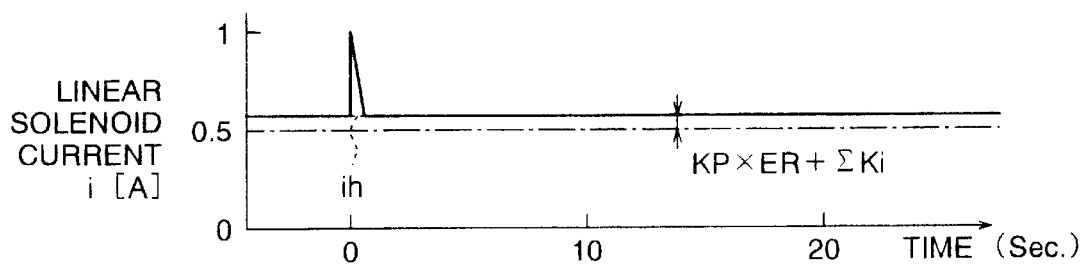
Figure 29:
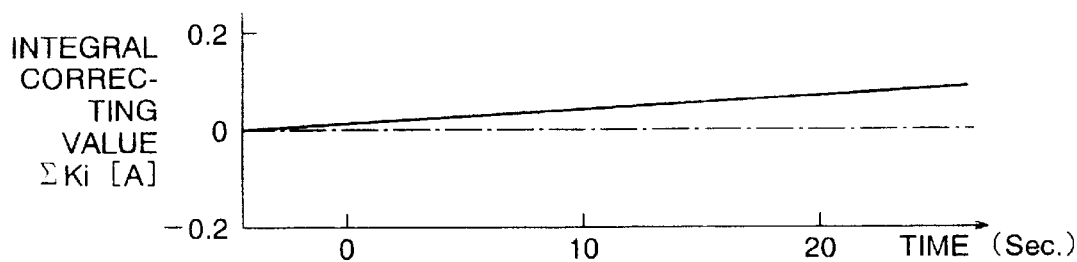

The routine illustrated in FIG. 5 differs from that described hereinbefore by reference to FIG. 28 in that the steps S40 and S41 are additionally provided.

Referring to FIG. 4, the microcomputer 101A fetches operation state signals such as the crank angle signal period T, the engine rotation number NE, the phase difference time ΔT, the intake air flow Q, the throttle opening degree θ and the cooling water temperature W in a step S1.

It should be added that the step S1 corresponds to the engine operation state detecting means 201 shown in FIG. 1.

Further, in steps S2 and S3, the actual valve timing Ta and the desired valve timing To are arithmetically determined, respectively, and then the timing deviation ER is calculated in accordance with the expression (4) mentioned hereinbefore in a step S4.

Incidentally, the steps S2 and S3 correspond to the actual valve timing detecting means 203 and the desired valve timing arithmetic means 202, respectively, which are shown in FIG. 1.

Subsequently, after completion of the processing step S4, the sign FER is placed for the preceding deviation sign FERb in a step S10, which is then followed by a decision step S11 where decision is made as to whether the timing deviation ER is equal to or greater than zero.

When the decision step S11 results in E≧0 (i.e., affirmation or "YES"), the sign FER is set to "1" (one) in a step S12, whereas when ER<0 (i.e., when the decision step S11 results in negation or "NO"), the sign FER of the deviation is reset to "0" (zero) in a step S13.

Through the processings in the steps S10 to S13, the sign of the current timing deviation ER is set as the sign FER of the deviation, while the sign of the timing deviation ER at the time point preceding by 25 msec. is set as the preceding deviation sign FERb.

In succession, after the execution of the processing steps S12 and S13, decision is made whether or not the sign FER of the deviation ER is "1" in a step S14. When this decision shows that FER=1 (i.e., when the answer of the decision step S14 is "YES"), this means that the actual valve timing Ta is retarding relative to the desired valve timing To. Accordingly, the incrementation/decrementation value ΔKi is added to the integral correcting value ΣKi in a step S15, whereupon the processing proceeds to a succeeding decision step S17.

On the other hand, when it is decided in the step S14 that FER=0 (i.e., when the answer of the decision step S14 is "NO"), this means that the actual valve timing Ta is advancing relative to the desired valve timing To. Accordingly, the incrementation/decrementation value ΔKi is subtracted from the integral correcting value ΣKi in a step S16, whereon the processing proceeds to the next decision step S17.

Incidentally, the steps S15 and S16 correspond to the integral control means 205 shown in FIG. 2.

The integral correcting value ΣKi is initialized to "0" in the step S8 shown in FIG. 5 immediately after the supply of electric power to the electronic control unit 100A by closing the key switch 117.

Next, a desired valve timing status decision reference value Tor is set as a reference value for making decision as to whether or not the desired valve timing To is in a constant status, and then it is decided whether or not an absolute value of the difference between the desired valve timing To and the desired valve timing status decision reference value Tor is smaller than a predetermined value E2 (e.g. 0.5° CA) in a step S17.

When it is decided in the step S17 that |To−Tor|≧E2 (i.e., when the decision step S17 results in "NO"), this means that the desired valve timing To is not constant. Accordingly, the current desired valve timing To is stored as the updated desired valve timing status decision reference value Tor in a step S18, whereon the learning counter (i.e., counter for the learning process) CLRN is reset to zero in a step S19. The processing can now proceed to a decision step S29 described hereinafter.

On the other hand, when it is decided in the step S17 that |To−Tor|<E2 (i.e., when the decision step S17 results in "YES"), this means that the desired valve timing To is substantially constant. In that case, decision is then made as to whether or not the absolute value of the timing deviation ER is smaller than the predetermined value E1 in a step S20.

When decision is made in the step S20 to the effect that |ER|≧E1 (i.e., when the decision step S20 results in negation or "NO"), the processing then proceeds to the step S19 where the learning counter CLRN is reset to zero. On the other hand, when the decision shows that |ER|<E1 (i.e., when the result of the decision step S20 is "YES"), this means that the condition enabling the learning of the holding current ih is satisfied. Accordingly, decision is then made in a step S21 as to whether or not the sign FER of the deviation ER coincides with the preceding deviation sign FERb.

When it is found in the step S21 that FER=FERb (i.e., when the decision step S21 results in "YES"), the processing proceeds to a decision step S29 described hereinafter.

On the other hand, when it is found that FER≠FERb (i.e., when the decision step S21 results in negation "NO"), this means that the sign FER of the timing deviation ER is inverted. Thus, the learning counter CLRN is incremented by "1" in a step S22, whereon decision is made as to whether or not the value of the learning counter CLRN is equal to or greater than "2" (step S23).

When it is found in the step S23 that CLRN<2 (i.e., when the decision step S23 results in "NO"), the processing proceeds to a decision step S28 described hereinafter, because the value of the learning counter CLRN is "1".

By contrast, when it is found that CLRN≧2 (i.e., when the decision step S23 results in "YES"), a mean value (ΣKi+Pi)/2 between the integral correcting value ΣKi and the peak value Pi of the integral correcting value ΣKi is arithmetically determined and stored as the deviation DEV of the integral correcting value (hereinafter referred to as the integral correcting value deviation DEV) in a step S24.

Further, a product (DEV×KL) resulting from multiplication of the integral correcting value deviation DEV by the updating coefficient KL is added to the learned value LRN for thereby updating the learned value LRN (step S25).

Parenthetically, the learned value LRN is initialized to "0" immediately after the battery 116 is connected to the electronic control unit 100A (see the step S40 in FIG. 5).

Subsequently, the value (DEV×KL) obtained by multiplying the integral correcting value deviation DEV by the updating coefficient KL is subtracted from the integral correcting value ΣKi for thereby updating the integral correcting value ΣKi (step S26).

Similarly, the predetermined value ΔKL is subtracted from the updating coefficient KL for thereby updating the updating coefficient KL (step S27). In that case, the updating coefficient KL is limited to the lower limit value KLm.

Incidentally, the updating coefficient KL is initialized to a predetermined value KLo in the step S41 shown in FIG. 5 immediately after the application of the electric power to the electronic control unit 100A upon closing of the key switch 117.

Subsequently, after execution of the step S27 or when decision is made that CLRN<2 in the step S23, the current integral correcting value ΣKi is stored as the peak value Pi of the integral correcting value ΣKi in the step S28.

At this juncture, it should be added that the steps S17 to S28 functionally correspond to the learning means 206 shown in FIG. 1.

Additionally, after execution of the step S19 or S28 or when it is decided that FER=FERb (i.e., "YES") in the step S21, decision is made again as to whether or not the absolute value of the timing deviation ER is smaller than the predetermined value E1 in a step S29.

When it is found in the decision step S29 that |ER|≧E1 (i.e., when the answer of the decision step S29 is "NO"), the actual valve timing control means 204 arithmetically determines the linear solenoid current i of the oil control valve 80 in accordance with the expression (9) mentioned hereinbefore (step S30).

More specifically, the actual valve timing control means 204 adds together the control quantity (KP×ER+0.5 ampere) arithmetically determined in accordance with the expression (3) mentioned hereinbefore, the integral correcting value ΣKi generated by the integral control means 205 and the learned value LRN generated by the learning means 206 to thereby output the sum quantity as a final or ultimate control quantity (i.e., ultimate linear solenoid current i).

On the other hand, when the decision step S29 results in that |ER|<E1 (i.e., when this step S29 results in "YES"), the actual valve timing control means 204 arithmetically determines the linear solenoid current i of the oil control valve 80 in accordance with the expression (11) mentioned hereinbefore in a step S31.

In more concrete, the actual valve timing control means 204 adds together the reference value of 0.5 ampere, the integral correcting value ΣKi and the learned value LRN to thereby output a final or ultimate control quantity (i.e., the linear solenoid current i).

Finally, the duty signal corresponding to the linear solenoid current i for the oil control valve 80 is outputted through the output port 108 in the step S7 mentioned hereinbefore, whereupon the processing routine illustrated in FIG. 4 comes to an end.

At this juncture, it should be added that the steps S29 to S31 and the step S7 mentioned above correspond to the actual valve timing control means 204 shown in FIG. 1.

As will now be understood from the foregoing description, by providing the learning means 206 for acquiring the learned value LRN of the control quantity (linear solenoid current i) corresponding to the holding current ih for the oil control valve 80 to thereby correct the control quantity immediately after the closing of the key switch 117, it is possible to make the actual valve timing Ta converge speedily to the desired valve timing To.

Additionally, because the integral control means 205 is so arranged as to decrease or increase the integral correcting value ΣKi for thereby correcting the incrementation/decrementation quantity of the learned value LRN upon updating of the learned value LRN, the control quantity is prevented from varying before and after the updating of the learned value LRN, whereby the control can be performed with enhanced stability.

Furthermore, by virtue of such arrangement of the learning means 206 that the learned value LRN is arithmetically determined on the basis of the mean value of the preceding integral correcting values ΣKi for acquiring by learning the median of the holding currents ih, it is possible to suppress positively variation of the learned value LRN even when the integral correcting value ΣKi should vary abnormally.

Besides, owing to such arrangement of the learning means 206 that the learned value LRN is arithmetically determined on the basis of the mean value of the preceding integral correcting values ΣKi when the increasing/decreasing direction of the integral correcting value ΣKi (deviation sign FER) is inverted for acquiring by learning the median of the holding currents ih, it is possible to determine with high accuracy the mean value of the integral correcting values ΣKi within a short time. In the case where the integral correcting values ΣKi varies only in one direction due to some abnormality, it is certainly impossible to determine the learned value LRN. In that case, however, erroneous learning (i.e., acquisition of erroneous learned value LRN) can be prevented.

Furthermore, since the learning means 206 is so designed as to reflect a part of the mean value of the integral correcting values ΣKi onto the learned value LRN, the learned value LRN can be protected against variation even when the mean value of the integral correcting values ΣKi should change abnormally.

Moreover, owing to such arrangement that the learning means 206 decreases the ratio of reflection of the mean value of the integral correcting values ΣKi onto the learned value LRN as the learning process proceeds, the learned value LRN can be made to be close to the actual holding current ih speedily immediately after closing of the key switch 117 at which probability of the learned value LRN deviating from the actual holding current ih is high. When the learned value LRN becomes at least approximately equal to the actual holding current ih as the learning process proceeds, the learned value LRN can be protected against variation even when the mean value of the integral correcting values ΣKi should change abnormally.

In addition, because the learning means 206 is designed so as to acquire the learned value LRN in the convergence status of the valve timing, the learning process is performed in the state where the control quantity (linear solenoid current i) is close to the actual holding current ih. Thus, the erroneous learning of the holding current ih can be excluded.

Embodiment 2

In the case of the valve timing control system according to the first embodiment of the invention, the learned value LRN is arithmetically determined by calculating the mean value of the integral correcting values ΣKi by resorting to the conventional arithmetic operation. However, the absolute value of the concern may equally be determined as a filtered value which is derived by filtering the integral correcting value ΣKi.

Further, in the valve timing control system according to the first embodiment, each of the learned values LRN determined arithmetically is reflected onto the linear solenoid current i. However, instead of reflecting the learned value LRN onto the linear solenoid current i, the integral correcting value ΣKi may be initialized to the learned value LRN immediately after application of electric power to the electronic control unit 100A by closing the key switch 117 (see FIG. 2), substantially to the same effect.

Now, the valve timing control system according to a second embodiment of the present invention will be described by reference to FIGS. 6 to 8. According to the second embodiment of the invention, the integral correcting value ΣKi is filtered for determining the mean value with the integral correcting value ΣKi being initialized to the learned value LRN.

More specifically, the integral control means 205 shown in FIG. 1 initializes the integral correcting value ΣKi on the basis of the learned value LRN immediately after the power-on of the electronic control unit 100A with the key switch 117 being closed.

Additionally, the learning means 206 includes a timer TM for the learning process (also referred to as the learning timer).

Figure 6:
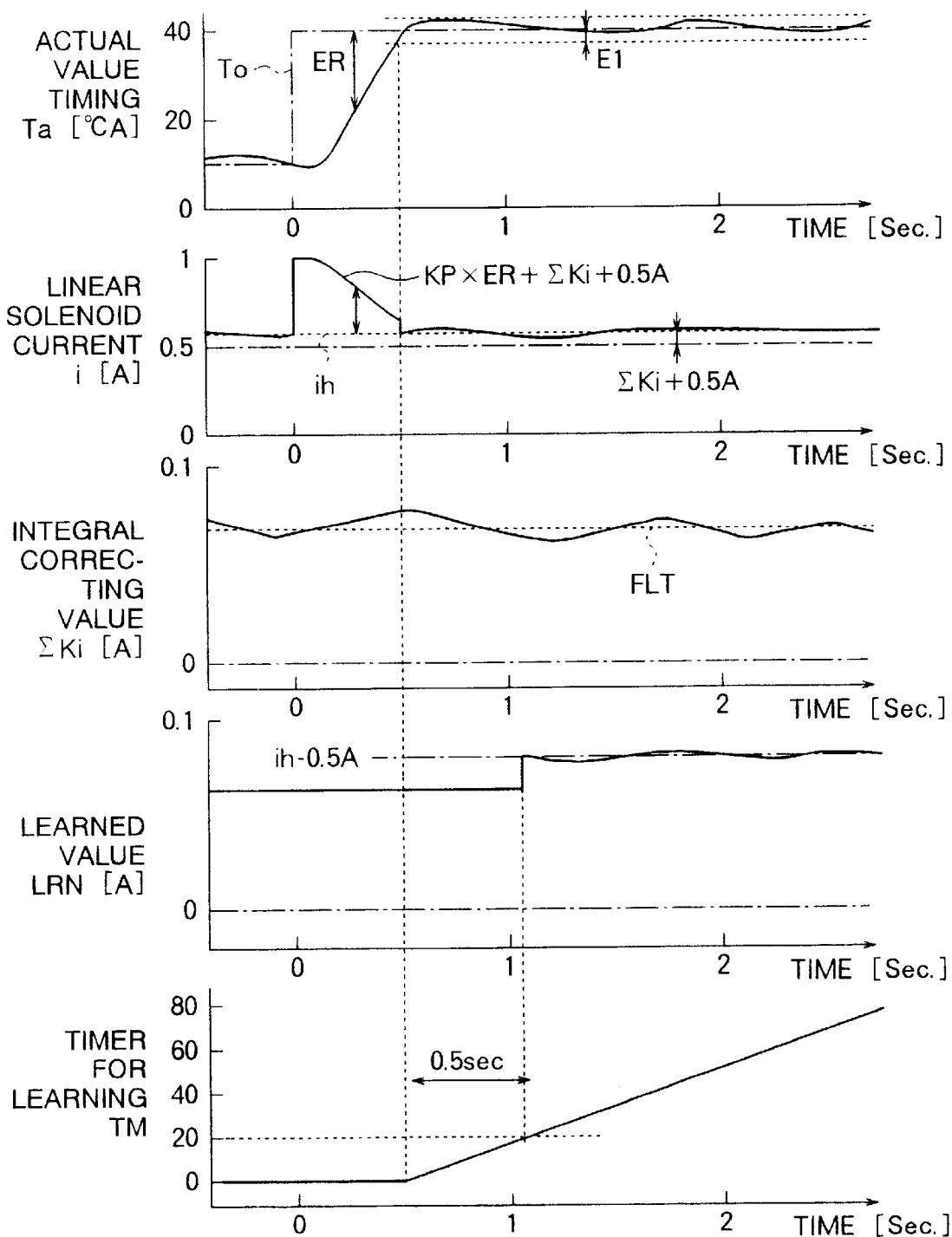
FIG. 6 is a timing chart for illustrating operation of the valve timing control system according to a second embodiment of the present invention.

Next, referring to the timing chart shown in FIG. 6, description will be directed to a holding current learning/control operation in the valve timing control system according to the second embodiment of the invention.

Referring to FIG. 6, when the absolute value of the timing deviation ER is equal to or greater than a predetermined value E1 (e.g. 1° in terms of crank angle or CA in abbreviation), the linear solenoid current i is arithmetically determined in accordance with the expression (6) mentioned hereinbefore, while the integral correcting value ΣKi appearing in the expression (6) is also arithmetically determined in accordance with the expression (10) mentioned hereinbefore.

On the other hand, when the absolute value of the timing deviation ER is smaller than a predetermined value E1, the linear solenoid current i can be arithmetically determined in accordance with the following expression (12):

$$i = \Sigma Ki + 0.5 [A] \qquad (12)$$

The above expression (12) corresponds to the expression (6) mentioned hereinbefore except that the proportional control value (KP×ER) is deleted.

Accordingly, in the state in which the actual valve timing Ta has converged substantially to the desired valve timing To, the proportional control can be invalidated to allow the actual valve timing Ta to change only through the integral control action, whereby the actual valve timing Ta can be controlled stably with reference to the desired valve timing To.

When the desired valve timing To varies, the actual valve timing Ta changes so as to converge to the desired valve timing To through the control procedure mentioned above. Further, in the convergence status in which the desired valve timing To is essentially constant and the absolute value of the timing deviation ER is smaller than the predetermined value E1, the linear solenoid current i determined in accordance with the expression (12) mentioned previously can be regarded as indicating essentially the actual holding current ih. Accordingly, the learning means 206 executes the learning procedure for acquiring the learned value LRN on the basis of the integral correcting value ΣKi, as described below.

Namely, when the convergence status continues to exist for a predetermined time period (e.g. 0.5 sec), the learning means 206 stores the filtered value FLT of the integral correcting value ΣKi as the learned value LRN (i.e., value acquired by learning).

The learned value LRN is held by the RAM 104 in the stored state by means of the backup power circuit 118 even for a period during which the key switch 117 is opened.

Accordingly, by initializing the integral correcting value ΣKi to the learned value LRN immediately after closing of the key switch 117, the actual valve timing Ta can be made to converge rapidly or speedily to the desired valve timing To.

Further, the filtered value FLT is initialized to the learned value LRN immediately following the turn-on of the key switch 117 as well.

At this juncture, it should also be added that the learned value LRN is initialized to "0" immediately following the electrical connection of the battery 116.

As will now be appreciated, the variable valve timing control can be simplified significantly as compared with the first embodiment of the invention by making use of the learned value LRN as the initial value for the integral correcting value ΣKi instead of reflecting a learned value LRN onto the linear solenoid current i.

Figure 7:
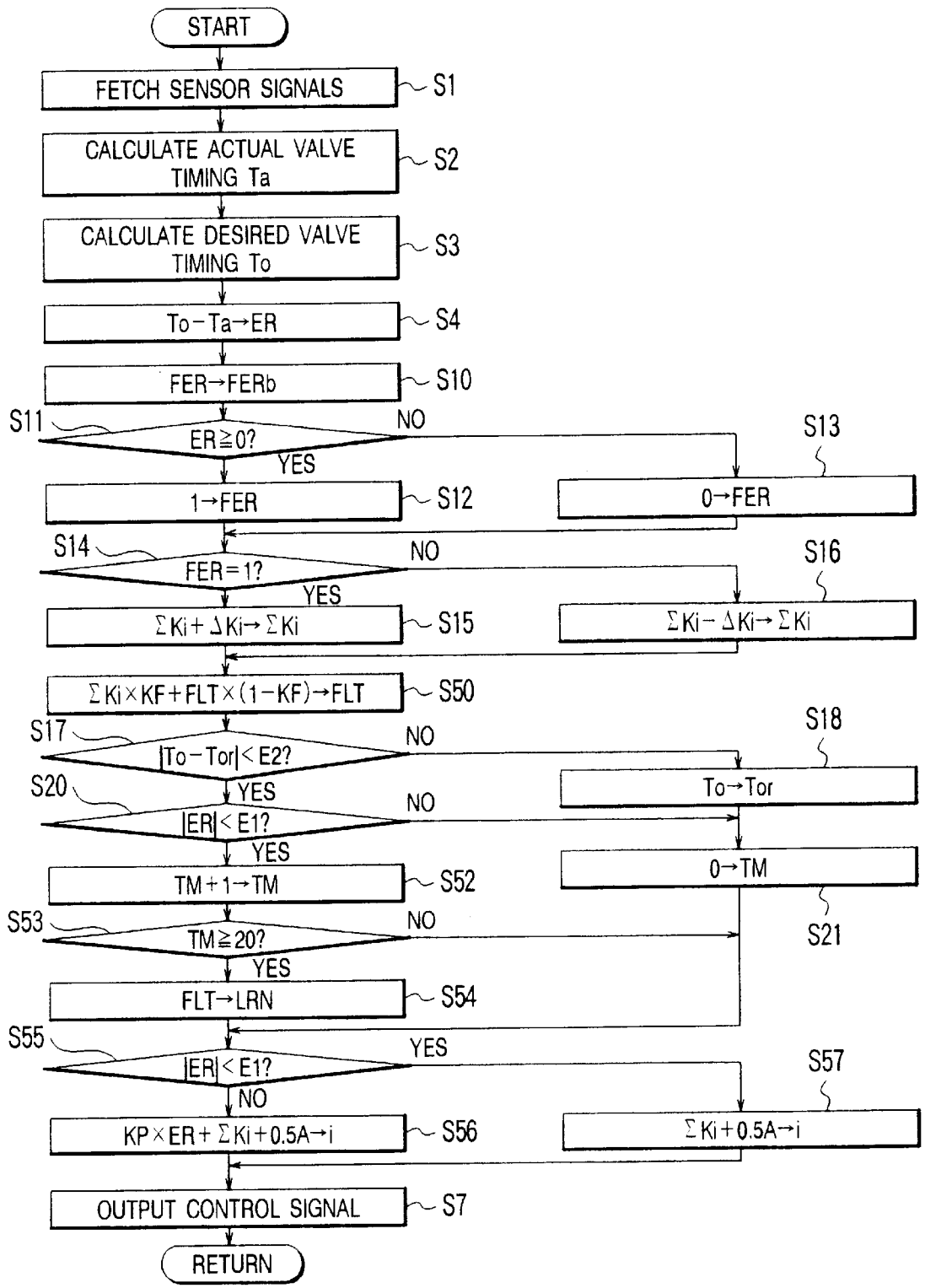
FIG. 7 is a flow chart for illustrating operations performed by the valve timing control system according to the second embodiment of the invention.
Figure 8:
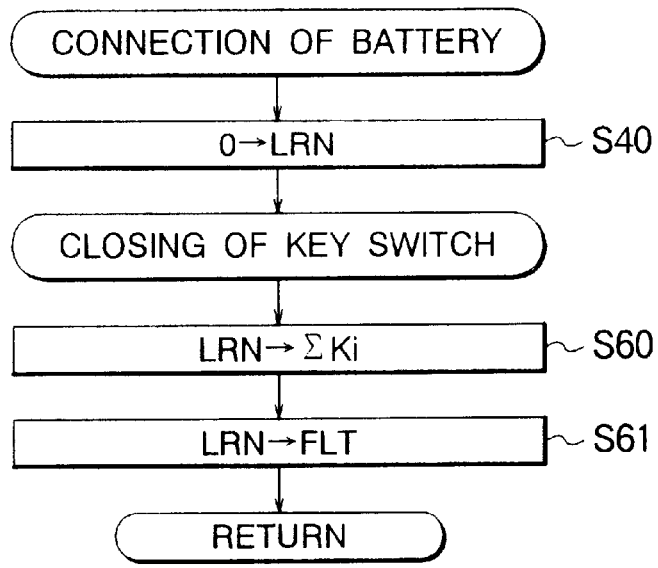
FIG. 8 is a flow chart for illustrating operations carried out by the valve timing control system according to the second embodiment of the invention.

Next, referring to flow charts shown in FIGS. 7 and 8, the operations of the valve timing control system according to the second embodiment of the invention will be elucidated in more concrete.

Referring to FIG. 7, a step S50 is added in succession to the step S15 shown in FIG. 4, while the step S19 shown in FIG. 4 is substituted for a step S51 while the steps S21 to S31 are replaced by steps S52 to S57.

Accordingly, the step S51 shown in FIG. 7 corresponds to the step S19 described hereinbefore, the step S52 corresponds to the step S22 mentioned hereinbefore and the step S55 corresponds to the step S29 described hereinbefore.

FIG. 7 shows in a flow chart illustrating a program executed by the CPU 102 at a time interval of 25 msec.

Similarly, as can be seen in FIG. 8, the steps S8 and S41 described hereinbefore by reference to FIG. 5 are replaced by steps S60 and S61.

Referring to FIG. 7, the steps S1 to S16 mentioned hereinbefore are executed at first, whereby the integral correcting value ΣKi is determined in the steps S15 and S16.

In this conjunction, it should be mentioned that the integral correcting value ΣKi has been initialized to the learned value LRN in a step S60 shown in FIG. 8 immediately following the application of electric power to the electronic control unit 100A by closing the key switch 117.

Subsequently, after execution of the processing steps S15 and S16, the filtered value FLT of the integral correcting value ΣKi is arithmetically determined in a step S50 in accordance with the following expression:

$$FLT = \Sigma Ki \times KF + FLT \times (1-KF) \tag{13}$$

In the above expression (13), the filtering coefficient KF for the filtering operation may be set around e.g. "0.1".

In this conjunction, it should be mentioned that the filtered value FLT has been initialized to the learned value LRN in a step S61 shown in FIG. 8, immediately following application of electric power to the electronic control unit 100A by closing the key switch 117.

Next, in the step S17 mentioned hereinbefore, decision is made as to whether or not the absolute value of the difference between the desired valve timing To and a desired valve timing status decision reference value Tor (i.e., reference value employed in the decision for determining whether the desired valve timing is constant or not) is smaller than a predetermined value E2 (e.g. 0.5° CA), wherein if it is decided that |To−Tor|≧E2 (i.e., when the decision step S17 results in "NO"), the current desired valve timing To is stored as an updated desired valve timing status decision reference value Tor in the step S18. In succession to the step S18, the timer TM for the learning process is reset to zero in a step S19.

On the other hand, when it is decided in the step S17 that |To−Tor|<E2 (i.e., when the decision step S17 results in "YES"), the desired valve timing To is regarded as being constant. In that case, decision is then made as to whether or not the condition that |ER|<E1 is satisfied in the step S20 mentioned hereinbefore.

When decision made in the step S20 shows that |ER|≧E1 (i.e., when the decision step S20 results in negation or "NO"), the timer TM for the learning process is reset to zero in a step S51 and then the processing proceeds to a step S55. In contrast, when the decision is made to the effect that |ER|<E1 (i.e., when the result of the decision step S20 is "YES"), the timer TM for the learning process is incremented by "1" (one) in a step S52, whereon the processing proceeds to a step S53.

Thus, the timer TM for the learning process indicates a time duration for which the desired valve timing To and the actual valve timing Ta are in the mutual convergence status.

Next, in succession to the step S52, it is decided in a step S53 whether or not the count of the timer TM for the learning process is greater than "20" inclusive.

When it is found in the step S53 that TM≧20 (i.e., when the decision step S53 results in "YES"), which means that the above-mentioned convergence status has continued for more than 0.5 sec. (=25 msec.×20), the filtered value FLT is stored as the learned value LRN (step S54), whereon the processing proceeds to a step S55.

On the other hand, when it is found in the step S53 that TM<20 (i.e., when the decision step S53 results in "YES"), the processing immediately proceeds to the decision step S55.

At this juncture, it should be added that the steps S17, S18, S20 and S50 to S54 functionally or equivalently correspond to the learning means 206 shown in FIG. 1.

Additionally, after execution of the step S51 or S54 or when the decision step S53 results in "NO", decision is again made as to whether or not the absolute value of the timing deviation ER is smaller than the predetermined value E1 in a step S55.

When it is found in the decision step S55 that |ER|≧E1 (i.e., when the answer of the decision step S55 is "NO"), the actual valve timing control means 204 arithmetically determines the linear solenoid current i of the oil control valve 80 in accordance with the expression (6) mentioned hereinbefore (step S56), whereon the processing proceeds to a step S7.

More specifically, the control quantity (KP×ER+0.5 ampere) arithmetically determined in accordance with the expression (3) mentioned hereinbefore and the integral correcting value ΣKi obtained from the integral control means 205 are added together to thereby determine a final or ultimate linear solenoid current i.

By contrast, when the decision step S55 results in that |ER|<E1 (i.e., when this step S55 results in "YES"), the linear solenoid current i of the oil control valve 80 is determined in accordance with the expression (12) mentioned hereinbefore in a step S57, whereon the processing proceeds to the step S7.

In this way, the linear solenoid current i can be determined ultimately by adding together the reference value (0.5 ampere) and the integral correcting value ΣKi.

Finally, the duty signal corresponding to the linear solenoid current i for the oil control valve 80 is outputted through the output port 108 in the step S7 mentioned hereinbefore, whereupon the processing routine illustrated in FIG. 7 comes to an end.

At this juncture, it should be added that the steps S55 to S57 and the step S7 mentioned above correspond to the actual valve timing control means 204.

As is apparent from the foregoing, according to the second embodiment of the present invention, the integral control means 205 initializes the integral correcting value ΣKi on the basis of the learned value LRN. Thus, the actual valve timing Ta can speedily be converged to the desired valve timing To even at the time point immediately following the closing of the key switch 117.

Embodiment 3

In the valve timing control systems according to the first and second embodiments of the invention, the learned value LRN is acquired on the basis of the mean value of the integral correcting values ΣKi. However, the integral correcting value ΣKi itself can be made use of as the learned value (i.e., value acquired by the learning process). Thus, according to the teaching of the invention incarnated in a third embodiment thereof, it is proposed that the integral correcting value ΣKi is held as the learned value in the stored state for a time period during which the key switch 117 is opened and that when the key switch 117 is closed, then the learned value (i.e., the integral correcting value ΣKi) is read out immediately without initializing the integral correcting value ΣKi.

Figure 9:
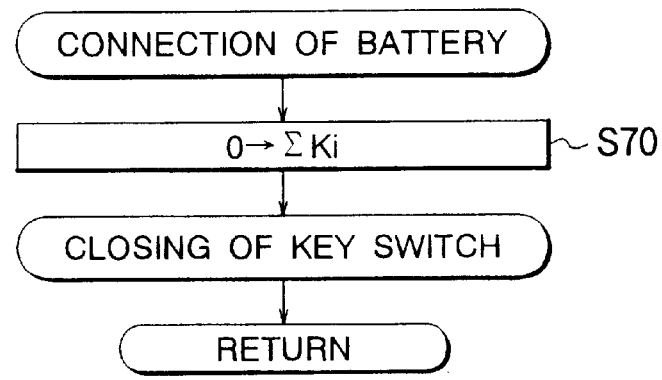
FIG. 9 is a flow chart for illustrating operations performed by the valve timing control system according to a third embodiment of the present invention.

FIG. 9 shows a flow chart for illustrating the operation of the valve timing control system according to the third embodiment of the invention which is so arranged as not to initialize the integral correcting value ΣKi at the time point the key switch 117 is closed.

As can be seen from FIG. 9, the integral control means 205 is designed to initialize the integral correcting value ΣKi to "0" immediately only when the battery 116 is electrically connected (see step S70).

However, at the time point immediately following the turn-on of the key switch 117, the integral control means 205 does not initialize the integral correcting value ΣKi but reads out the learned value stored and held before the key switch 117 was opened.

Except for the operation described above, operation of the valve timing control system according to the third embodiment of the invention is similar to that of the system described hereinbefore (see FIG. 27).

Embodiment 4

In the valve timing control system according to the first embodiment of the invention, the learned value LRN is arithmetically determined on the basis of the mean value of the integral correcting values ΣKi upon inversion of the sign of the timing deviation ER. However, the learned value LRN can be determined on the basis of the mean value of the integral correcting values ΣKi derived periodically at a redetermined time interval.

Embodiment 5

In the valve timing control system according to the first embodiment of the invention, the electric current value obtained by subtracting the reference value (0.5 ampere) from the actual holding current ih is used as the learned value LRN. However, the current value corresponding to the actual holding current ih can be made use of as the learned value LRN.

To this end, the learned value LRN may be initialized to the reference value (0.5 ampere) upon electrical connection of the battery 116 without clearing the learned value LRN to zero (step S40 in FIG. 5). In that case, the control quantity (the linear solenoid current i) is arithmetically determined without addition of 0.5 ampere (steps S30 and S31 in FIG. 4).

Embodiment 6

In the valve timing control system according to the first embodiment of the invention, feedback control is realized by resorting to the proportional control action and the integral control action. It should, however, be appreciated that a differential control action may be added, as is disclosed, for example, in Japanese Patent Laid-open No. 159021/1994 (JP-A-6-159021).

Embodiment 7

In the case of the valve timing control system according to the first embodiment of the invention, it has been assumed that the invention is applied to the system in which the main body of the variable valve timing mechanism 40 is adapted to rotate in unison with the intake timing pulley 21 (see FIG. 10). However, the invention is never restricted to such arrangement but can equally find application to a system in which the main body of the variable valve timing mechanism 40 does not rotate, as disclosed, for example, in Japanese Patent Application No. 267603/1996 (JP-8-267603).

Further, it goes without saying that the concept of the invention is equally applied to the system in which the actual valve timing Ta is detected by using a potentiometer.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described. Accordingly, all suitable modifications and equivalents may be resorted to, falling within the spirit and scope of the invention.

What is claimed is:

1. A valve timing control system for an internal combustion engine, comprising:

an intake valve (17) and an exhaust valve (18) driven in synchronism with rotation of said internal combustion engine for opening or closing an intake passage (15) and an exhaust passage (16), respectively, which are communicated to a combustion chamber (8) of said internal combustion engine;

engine operation state detecting means (201) for detecting engine operation states (D) of said internal combustion engine;

desired valve timing arithmetic means (202) for arithmetically determining a desired valve timing (To) for at least one of said intake valve (17) and said exhaust valve (18) in dependence on said engine operation state (D) as detected;

variable valve timing mechanism (40) for changing open/ close timing of at least one of said intake valve (17) and said exhaust valve (18);

actual valve timing detecting means (203) for detecting an actual valve timing (Ta) of at least one of said intake valve (17) and said exhaust valve (18);

actual valve timing control means (204) for generating a first control quantity (i) for said variable valve timing mechanism (40) so that a timing deviation (ER) of said actual valve timing (Ta) from said desired valve timing (To) becomes zero;

integral control means (205) for arithmetically determining an integral correcting value ($\Sigma$Ki) for correcting said first control quantity (i) by integrating said timing deviation (ER); and learning means (206) for acquiring a learned value (LRN) of a second control quantity (ih) required for holding said actual valve timing (Ta) on the basis of said integral correcting value ($\Sigma$Ki).

2. A valve timing control system for an internal combustion engine according to claim 1, wherein said actual valve timing control means (204) corrects said control quantity (i) on the basis of said learned value (LRN).

3. A valve timing control system for an internal combustion engine according to claim 2, wherein said integral control means (205) decreases said integral correcting value ($\Sigma$Ki) by an increment of said learned value (LRN) while increasing said integral correcting value ($\Sigma$Ki) by an decrement of said learned value (LRN) upon updating of said learned value (LRN).

4. A valve timing control system for an internal combustion engine according to claim 1, wherein said integral control means (205) initializes said integral correcting value ($\Sigma$Ki) on the basis of said learned value (LRN).

5. A valve timing control system for an internal combustion engine according to claim 4, further comprising:

a battery (116) connected to said valve timing control system (100A) for said internal combustion engine;

a key switch (117) inserted between said battery (116) and said valve timing control system (100A) for supplying selectively electric power to said valve timing control system; and a backup power circuit (118) inserted between said battery (116) and said learning means (206) for supplying electric power to said learning means (206), wherein said learning means (206) holds the learned value (LRN), being supplied with electric power through said backup power circuit (118), even during a time period for which said key switch (117) is opened, and wherein said integral control means (205) initializes said integral correcting value ($\Sigma$Ki) upon closing of said key switch (117).

6. A valve timing control system for an internal combustion engine according to claim 1, wherein said learning means (206) learns said integral correcting value ($\Sigma$Ki) as said learned value (LRN).

7. A valve timing control system for an internal combustion engine according to claim 1, wherein said learning means (206) is so arranged as to arithmetically determine said learned value (LRN) on the basis of a mean value of said integral correcting values ($\Sigma$Ki).

8. A valve timing control system for an internal combustion engine according to claim 7, wherein said learning means (206) is so arranged as to arithmetically determine said learned value (LRN) on the basis of a mean value of said integral correcting values ($\Sigma$Ki) sampled at several time points after inversion of the increasing or decreasing direction of said integral correcting value ($\Sigma$Ki).

9. A valve timing control system for an internal combustion engine according to claim 7, wherein said learning means (206) is so arranged as to reflect a part of said mean value of said integral correcting values ($\Sigma$Ki) to said learned value (LRN).

10. A valve timing control system for an internal combustion engine according to claim 9, wherein said learning means (206) is so arranged as to set variably a ratio of reflection of said mean value of said integral correcting values ($\Sigma$Ki) reflected to said learned value (LRN) such that said ratio of reflection decreases as the learning proceeds.

11. A valve timing control system for an internal combustion engine according to claim 7, wherein said learning means (206) is so arranged as to arithmetically determine said learned value (LRN) on the basis of a mean value of said integral correcting values ($\Sigma$Ki) at every predetermined time interval.

12. A valve timing control system for an internal combustion engine according to claim 7, wherein said learning means (206) is so arranged as to perform filtering arithmetic processing for said integral correcting value ($\Sigma$Ki) to thereby determine arithmetically a filtered value (FLT) resulting from said filtering arithmetic processing as said mean value.

13. A valve timing control system for an internal combustion engine according to claim 1, wherein said learning means (206) is so arranged as to determine a holding current (ih) required for holding said actual valve timing as said learned value (LRN) of the control quantity relevant to said integral correcting value $\Sigma$(Ki).

14. A valve timing control system for an internal combustion engine according to claim 1, wherein said learning means (206) is so arranged as to determine a current value obtained by subtracting a reference current value (ib) from a holding current (ih) required for holding said actual valve timing as said learned value (LRN) of the control quantity relevant to said integral correcting value $\Sigma$(Ki).

15. A valve timing control system for an internal combustion engine according to claim 1, wherein said learning means (206) acquires said learned value (LRN) when said desired valve timing (To) is substantially constant and unless said timing deviation (ER) exceeds a predetermined value (E1).

* * * * *